(12) United States Patent
Nakamura et al.

(10) Patent No.: US 11,290,613 B2
(45) Date of Patent: Mar. 29, 2022

(54) INFORMATION PROCESSING SYSTEM, INFORMATION PROCESSING METHOD, AND INFORMATION PROCESSING APPARATUS

(71) Applicant: Ricoh Company, Ltd., Tokyo (JP)

(72) Inventors: Yutaka Nakamura, Kanagawa (JP); Keisuke Terasaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/023,492

(22) Filed: Sep. 17, 2020

(65) Prior Publication Data

US 2021/0168261 A1  Jun. 3, 2021

(30) Foreign Application Priority Data

Nov. 28, 2019  (JP) .............................. JP2019-215650

(51) Int. Cl.
| | |
|---|---|
| *G06F 3/12* | (2006.01) |
| *H04N 1/32* | (2006.01) |
| *H04N 1/00* | (2006.01) |

(52) U.S. Cl.
CPC ..... *H04N 1/32368* (2013.01); *H04N 1/00403* (2013.01); *H04N 1/32507* (2013.01)

(58) Field of Classification Search
CPC .......... H04N 1/32368; H04N 1/00403; H04N 1/32507
See application file for complete search history.

(56) References Cited

U.S. PATENT DOCUMENTS

| | | | |
|---|---|---|---|
| 2018/0005631 A1* | 1/2018 | Lee | ........................ G06F 3/167 |
| 2019/0304453 A1 | 10/2019 | Nakamura | |
| 2020/0175982 A1 | 6/2020 | Nakamura | |
| 2020/0175984 A1 | 6/2020 | Iwasa | |
| 2020/0177407 A1 | 6/2020 | Nakamura | |
| 2020/0177744 A1 | 6/2020 | Yoshimi | |
| 2020/0177746 A1 | 6/2020 | Katsumata | |
| 2020/0177747 A1 | 6/2020 | Yasuda et al. | |
| 2020/0184970 A1* | 6/2020 | Kawano | ................. G10L 15/22 |
| 2021/0097989 A1* | 4/2021 | Lee | ..................... G10L 15/1822 |

FOREIGN PATENT DOCUMENTS

| | | |
|---|---|---|
| JP | 2000-227938 | 8/2000 |
| JP | 2006-018028 | 1/2006 |
| JP | 2019-185734 | 10/2019 |

OTHER PUBLICATIONS

U.S. Appl. No. 16/808,944, filed Mar. 4, 2020 Hajime Kubota.

* cited by examiner

*Primary Examiner* — Moustapha Diaby
(74) *Attorney, Agent, or Firm* — Xsensus LLP

(57) ABSTRACT

An information processing system includes an information input device and an information processing apparatus. The information input device acquires audio information. The information processing apparatus is connected to the information input device via a network. The information processing apparatus includes circuitry that, based on a determination that the audio information acquired by the information input device is incomplete, complements the audio information, converts the audio information into process information, and transmits the process information to a target apparatus.

10 Claims, 18 Drawing Sheets

| DEVICE ID OF INFORMATION INPUT DEVICE | USER ID | USER NAME |
|---|---|---|
| ud1001 | r0001 | Hamada |
| ud1002 | r0002 | Yamashita |
| ... | ... | ... |

| DEVICE ID OF INFORMATION INPUT DEVICE | MANAGEMENT APPARATUS ID | CONNECTION INFORMATION |
|---|---|---|
| ud1001 | k0001 | AAAA |
| ud1002 | k0002 | BBBB |
| ... | ... | ... |

FIG. 5C

| DEVICE ID OF INFORMATION INPUT DEVICE | EXTERNAL RESOURCE ID | EXTERNAL RESOURCE NAME | EQUIPMENT RESOURCE ID | EQUIPMENT RESOURCE NAME |
|---|---|---|---|---|
| ud1001 | r0001 | MEETING ROOM MA | ro0011 | PROJECTOR P1 |
| ud1002 | r0002 | MEETING ROOM MB | ro0012 | PROJECTOR P2 |
| ud1003 | r0003 | MEETING ROOM MC | ro0013 | IWB α |
| ud1004 | r0004 | FIRST RECEPTION ROOM | ro0014 | NETWORK TV NT |
| ud1005 | r0005 | SECOND RECEPTION ROOM | ro0015 | SPEAKER SP |
| ud1006 | r0006 | THIRD RECEPTION ROOM | N/A | N/A |
| ... | ... | ... | ... | ... |
| ud1137 | r0021 | CAR RENTAL COMPANY W | ro0038 | CHILD SEAT |
| ud1358 | r0022 | CAR RENTAL COMPANY X | ro0055 | DASHBOARD CAMERA |
| ud1300 | r0023 | TAXI COMPANY Y | N/A | N/A |
| ud1400 | r0024 | BIKE RENTAL | ro0200 | DUST MASK |
| ... | ... | ... | ... | ... |

FIG. 7A

| EXTERNAL RESOURCE ID | EXTERNAL RESOURCE NAME | DATE AND TIME | USER ID | USER NAME | EXECUTION COMMAND |
|---|---|---|---|---|---|
| r0001 | MEETING ROOM MA | 2019/01/01 9:00-10:00 | OPEN | OPEN | START AIR CONDITIONING |
| | | 2019/01/01 10:00-11:00 | u0010 | Yamada | TURN ON LIGHT AND UNLOCK DOOR |
| | | 2019/01/01 11:00-12:00 | u0010 | Yamada | TURN ON LIGHT |
| | | ... | ... | ... | ... |
| r0002 | MEETING ROOM MB | 2019/01/01 9:00-10:00 | u0011 | Sato | START AIR CONDITIONING |
| | | 2019/01/01 10:00-11:00 | u0011 | Sato | TURN ON LIGHT AND UNLOCK DOOR |
| | | 2019/01/01 11:00-12:00 | OPEN | OPEN | STOP AIR CONDITIONING |
| ... | ... | | | | ... |

| EXTERNAL RESOURCE ID | EXTERNAL RESOURCE NAME | DATE AND TIME | USER ID | USER NAME | EXECUTION COMMAND |
|---|---|---|---|---|---|
| r0021 | RENTAL CAR RA | 2019/01/01 9:00-10:00 | - | - | - |
| | | 2019/01/01 10:00-11:00 | - | - | - |
| | | 2019/01/01 11:00-12:00 | - | - | - |
| | | ... | ... | ... | ... |
| r0022 | RENTAL CAR RB | 2019/01/01 9:00-10:00 | u0358 | Kimura | ALLOCATE CAR |
| | | 2019/01/01 10:00-11:00 | u0358 | Kimura | ALLOCATE CAR |
| | | 2019/01/01 11:00-12:00 | u0358 | Kimura | ALLOCATE CAR |
| | | ... | ... | ... | ... |
| ... | | | | | |

601

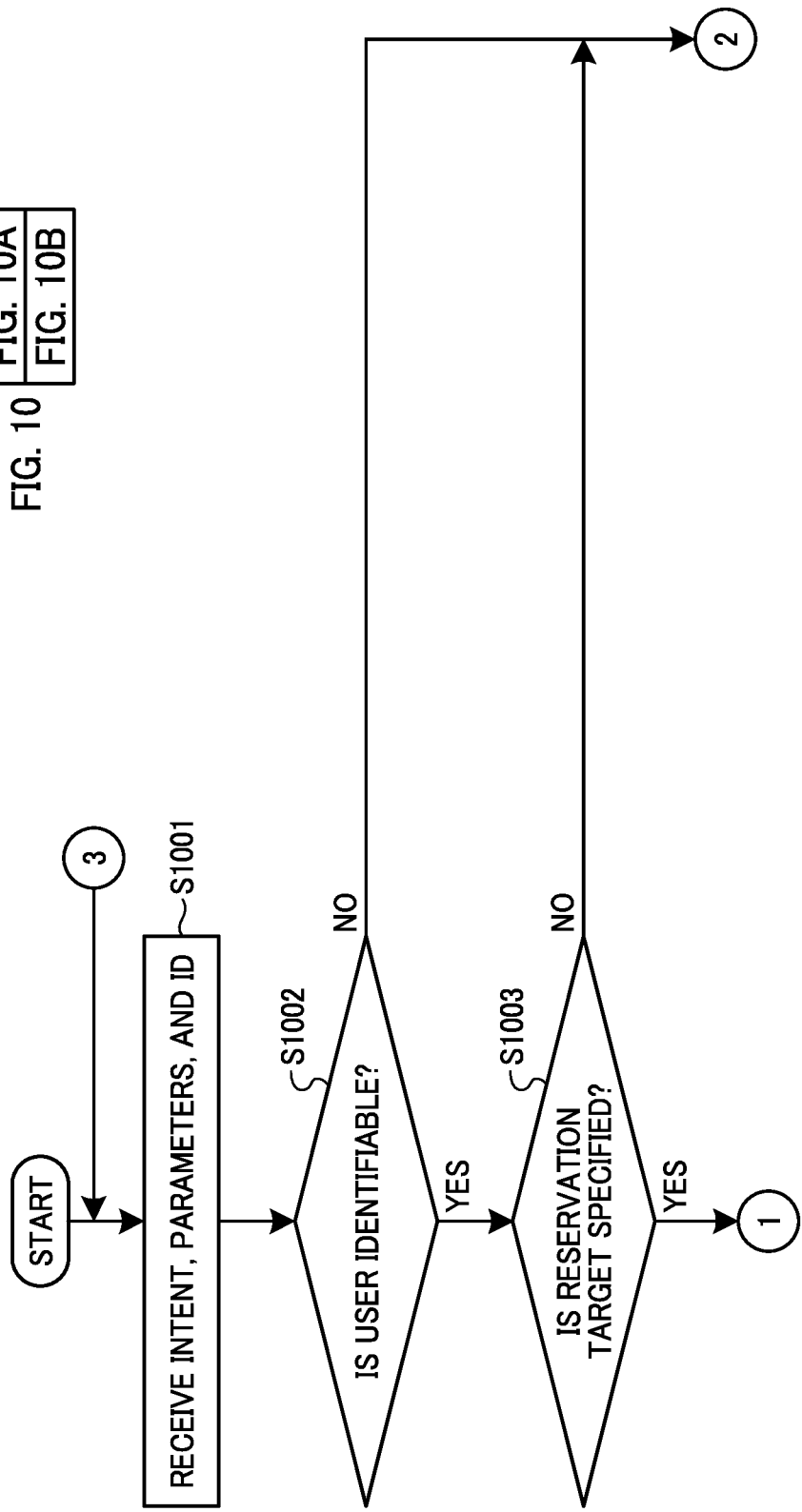

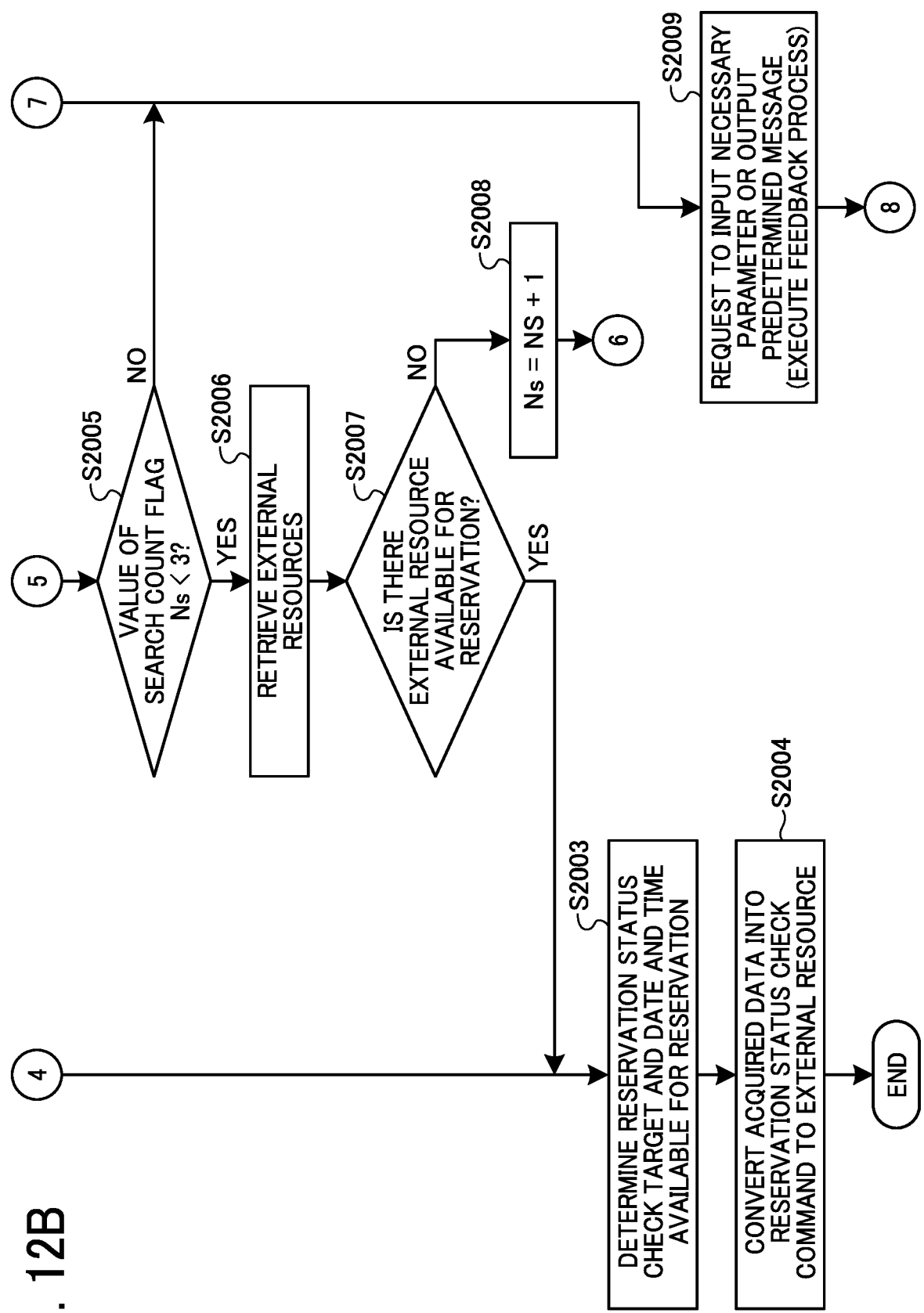

though it is to be understood that each specific element includes all technical equivalents that operate in a similar manner and achieve a similar result.

INFORMATION PROCESSING SYSTEM, INFORMATION PROCESSING METHOD, AND INFORMATION PROCESSING APPARATUS

CROSS-REFERENCE TO RELATED APPLICATION

This patent application is based on and claims priority pursuant to 35 U.S.C. § 119(a) to Japanese Patent Application No. 2019-215650 filed on Nov. 28, 2019 in the Japan Patent Office, the entire disclosure of which is hereby incorporated by reference herein.

BACKGROUND

Technical Field

The present invention relates to an information processing system, an information processing method, and an information processing apparatus.

Description of the Related Art

Nowadays, there are artificial intelligence (AT) voice assistant systems enabling the operation of an apparatus with voice and smart household appliances operable with voice. The field of voice input operation is expected to further grow.

As an example of an apparatus using the voice input operation, there is an application receiving apparatus that, when an applicant inputs a plurality of items of an application to application receiving apparatus through the voice input, allows the applicant to input desired items in a desired order.

According to the apparatus, however, when there are items that should be input through the voice input with utterance, the applicant is asked to input all of these items through the voice input.

SUMMARY

In one embodiment of this invention, there is provided an improved information processing system that includes, for example, an information input device and an information processing apparatus. The information input device acquires audio information. The information processing apparatus is connected to the information input device via a network. The information processing apparatus includes circuitry that, based on a determination that the audio information acquired by the information input device is incomplete, complements the audio information, converts the audio information into process information, and transmits the process information to a target apparatus.

In one embodiment of this invention, there is provided an improved information processing method that includes, for example, acquiring audio information from an information input device, complementing the audio information based on a determination that the audio information is incomplete, converting the audio information into process information, and transmitting the process information to a target apparatus.

In one embodiment of this invention, there is provided an improved information processing apparatus that includes, for example, circuitry that acquires audio information, complements the audio information based on a determination that the acquired audio information is incomplete, converts the audio information into process information, and transmits the process information to a target apparatus.

BRIEF DESCRIPTION I/F THE SEVERAL VIEWS I/F THE DRAWINGS

A more complete appreciation of the disclosure and many of the attendant advantages and features thereof can be readily obtained and understood from the following detailed description with reference to the accompanying drawings, wherein.

Figure 6:
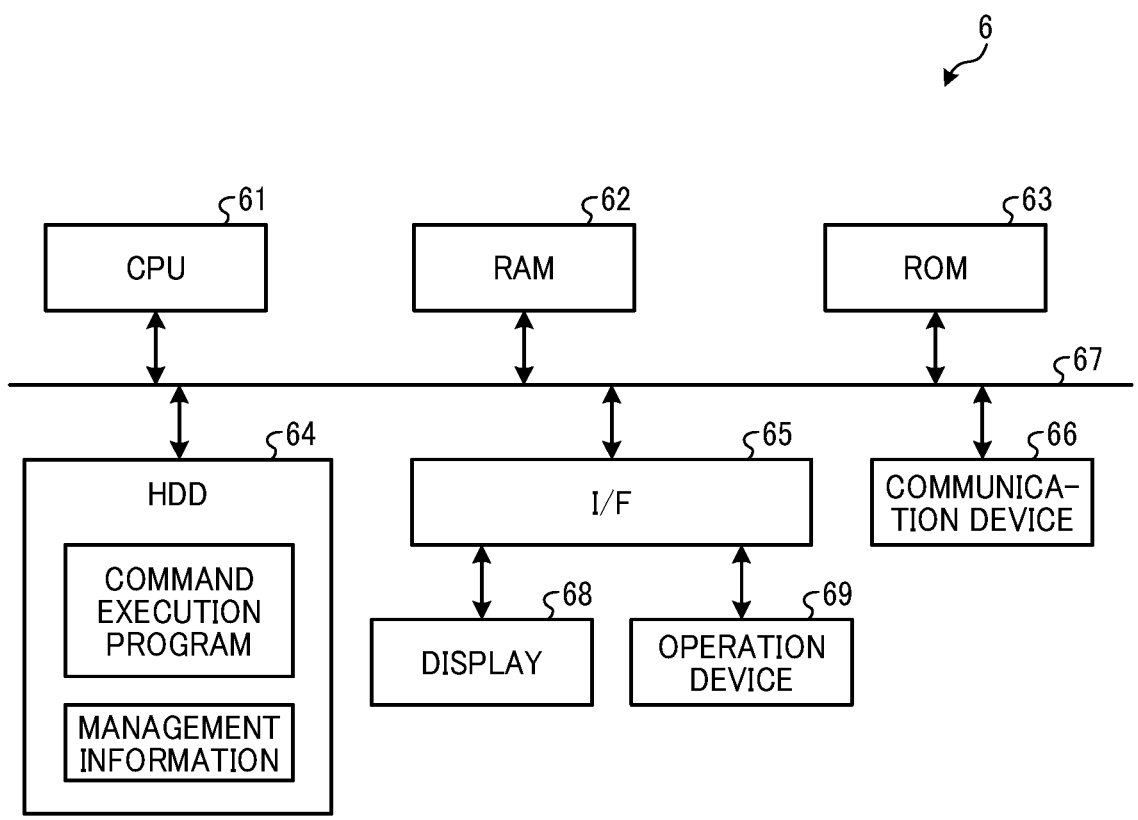
Figure 8A:
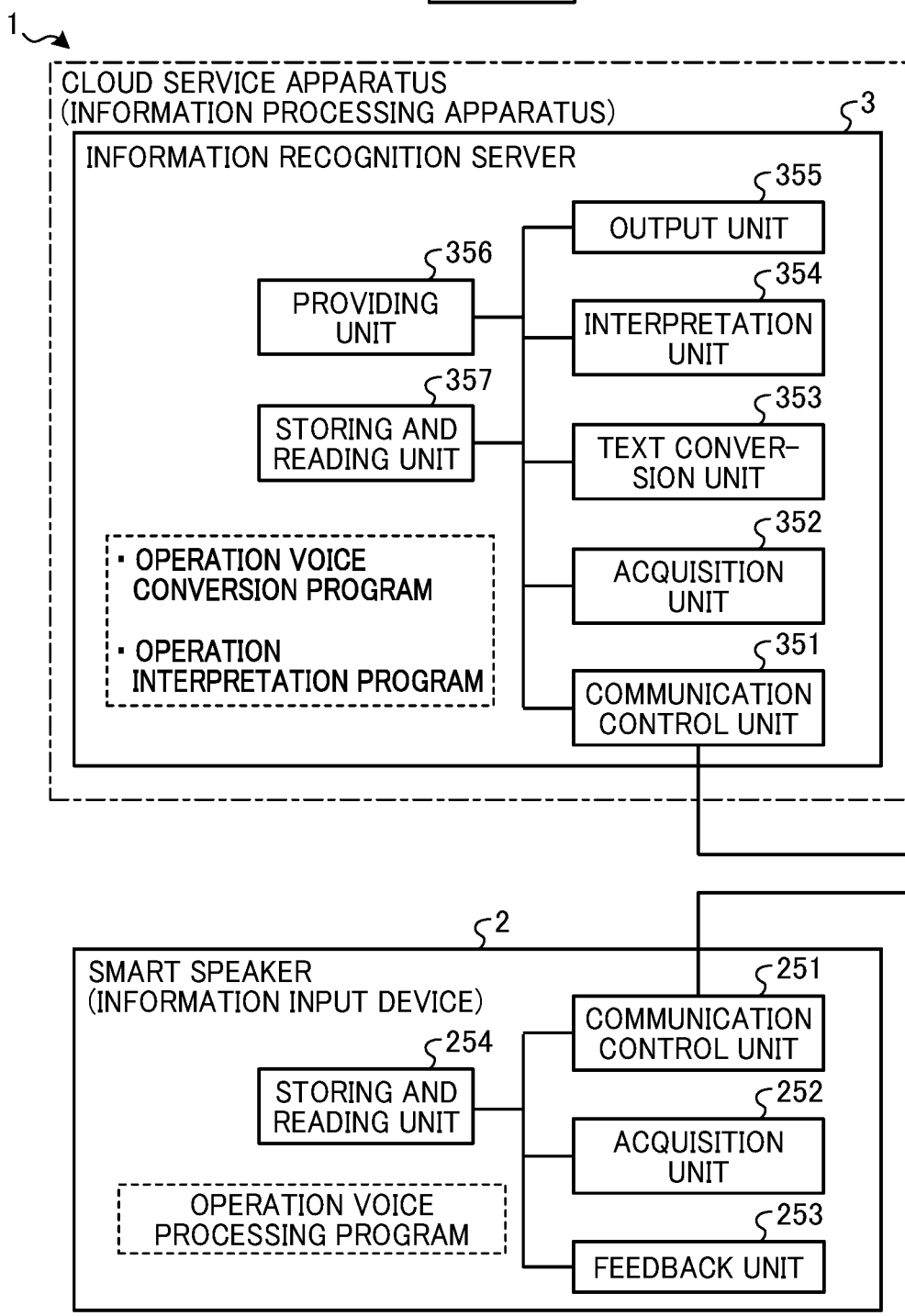
Figure 8B:
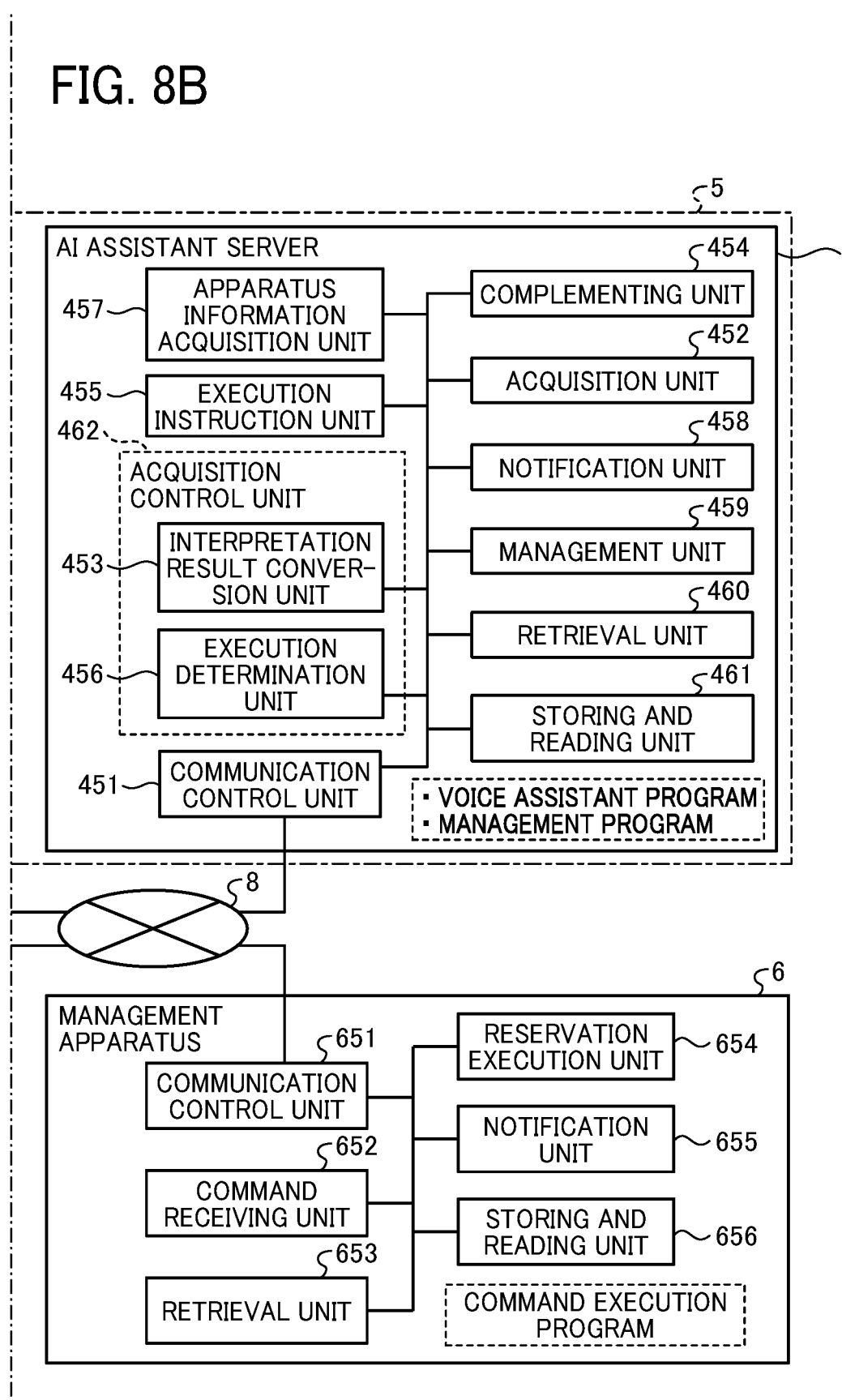
Figure 9:
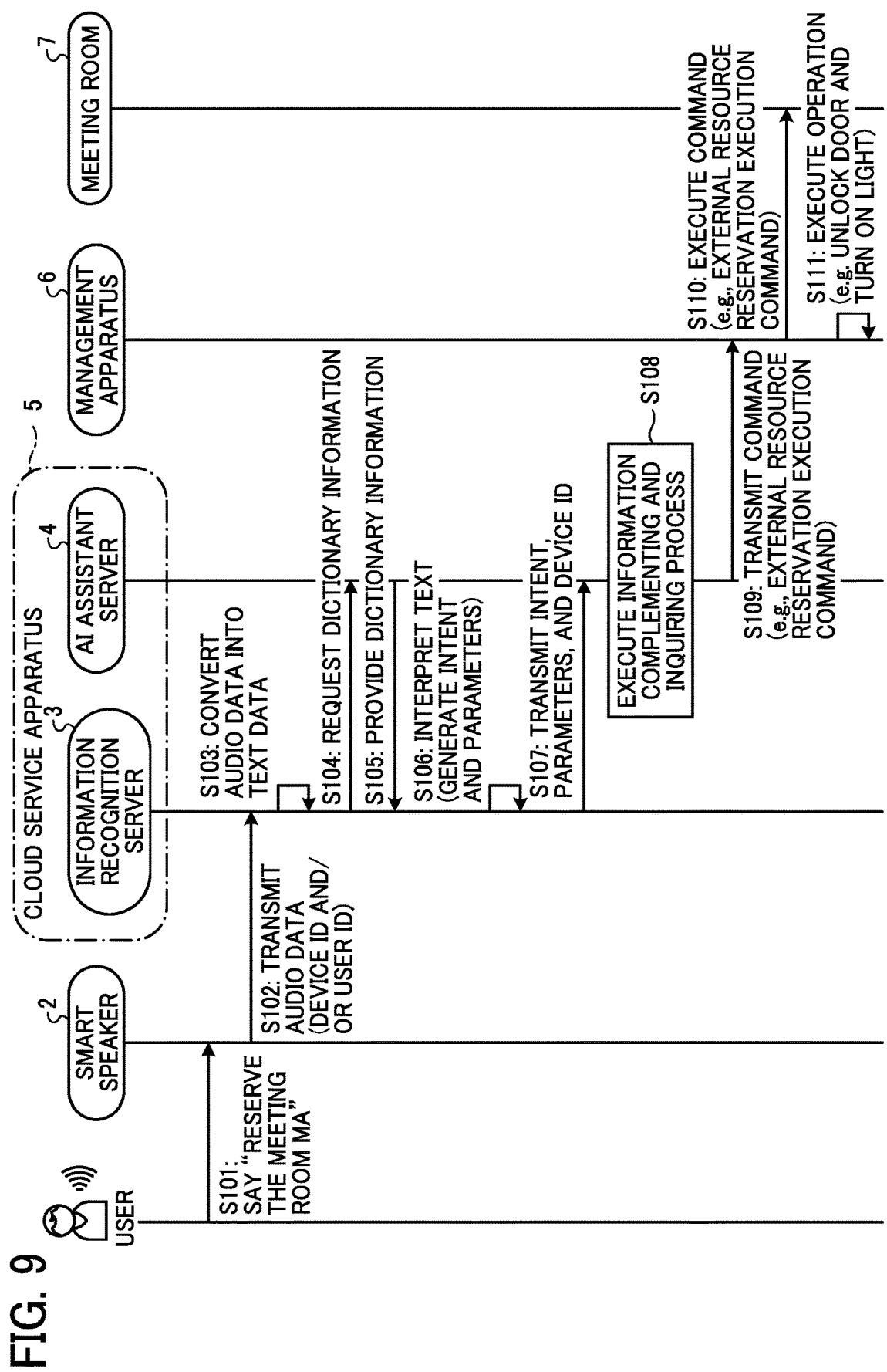
Figure 10B:
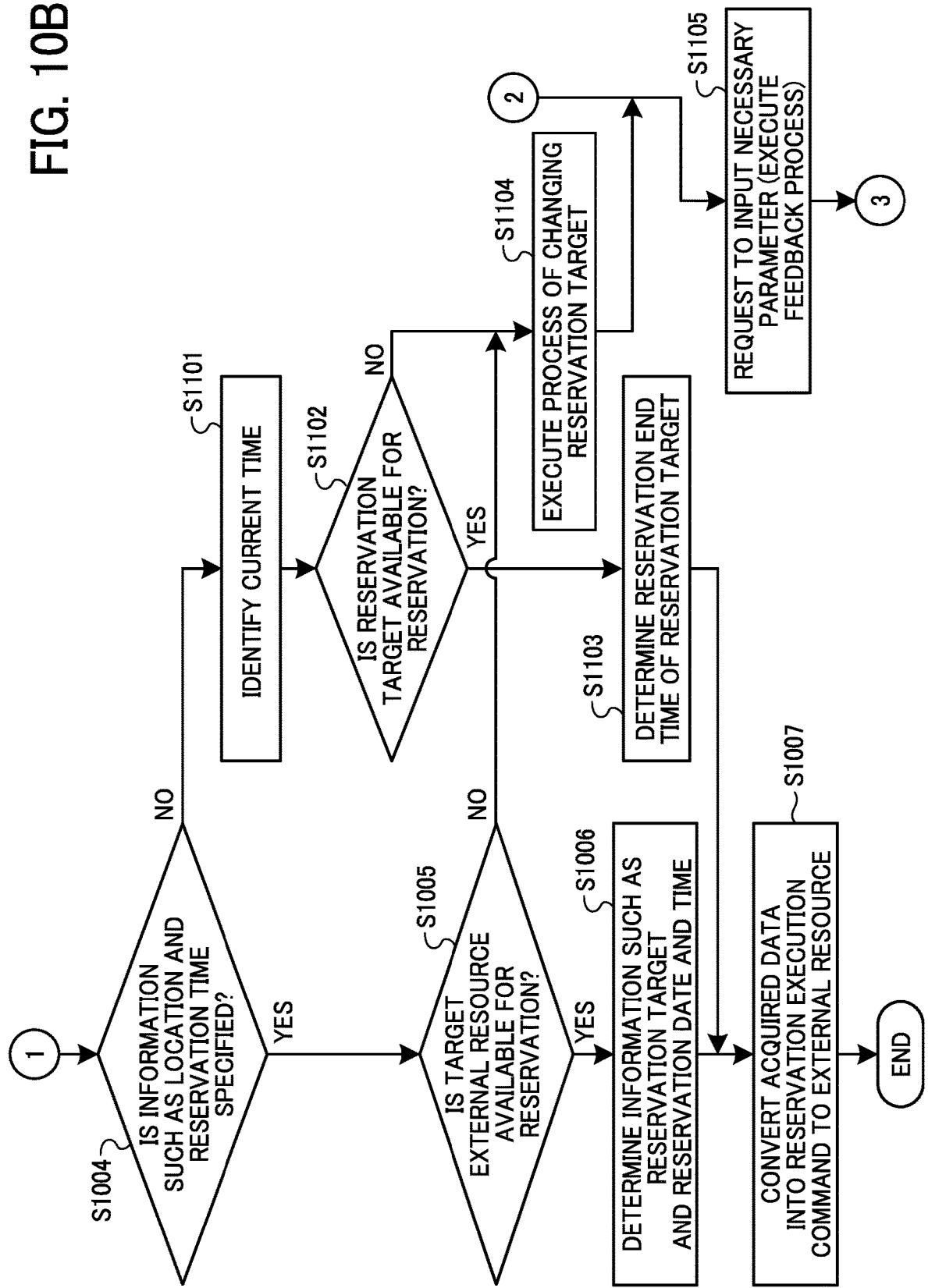
Figure 11:
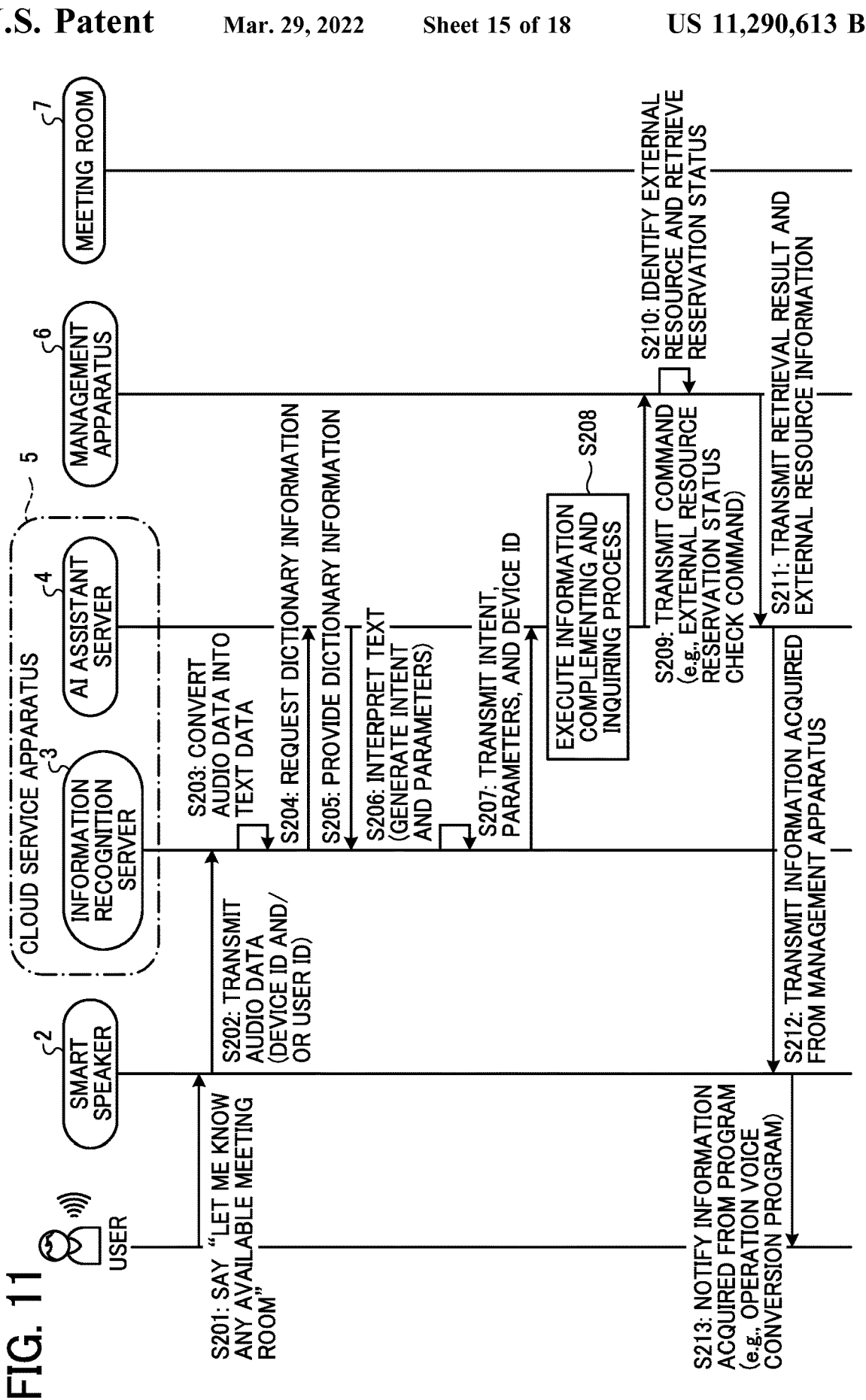
Figure 12A:
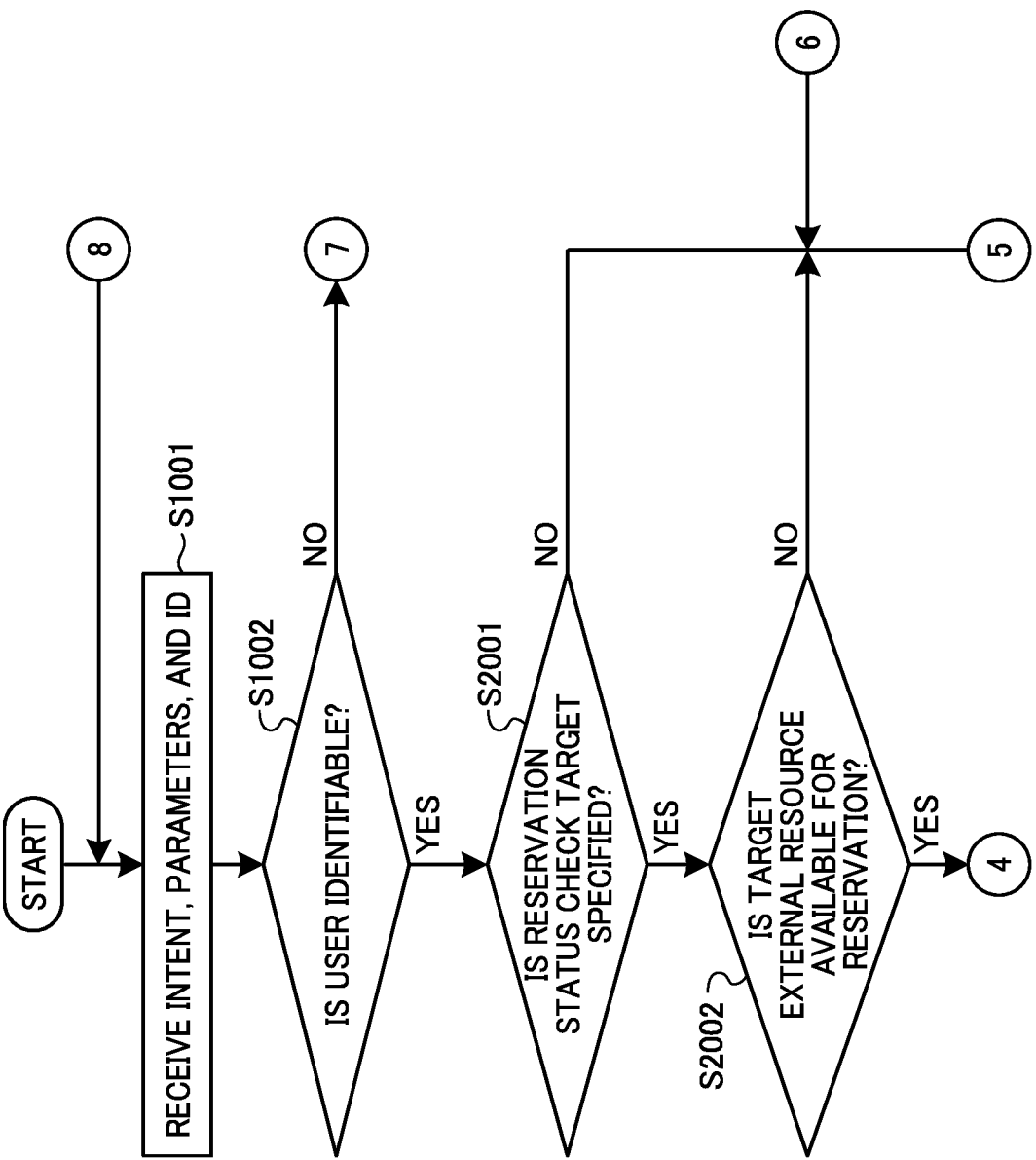
Figure 13:
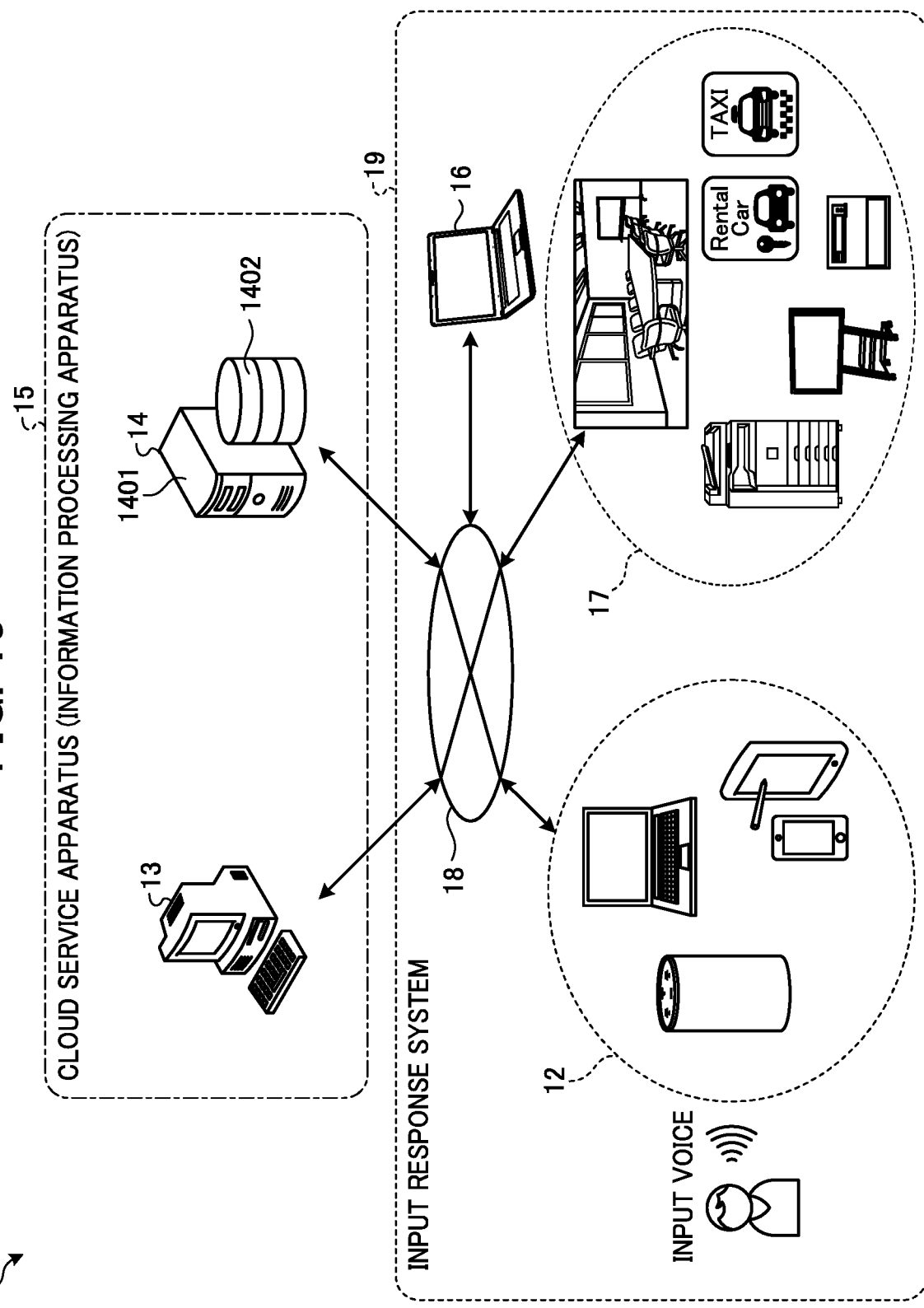

FIGS. 5A, 5B, and 5C are diagrams illustrating examples of various table data managed in an association database in the input operation system of the first embodiment;

FIG. 6 is a diagram illustrating a hardware configuration of a management apparatus included in the input operation system of the first embodiment;

FIGS. 7A and 7B are diagrams illustrating examples of management information of the first embodiment;

FIGS. 8A and 8B are functional block diagrams of apparatuses forming the input operation system of the first embodiment;

FIG. 9 is a sequence chart illustrating a procedure of processes performed in the first embodiment;

FIGS. 10A and 10B are a flowchart illustrating an information complementing and inquiring process performed in the first embodiment;

FIG. 11 is a sequence chart illustrating a procedure of processes performed in a second embodiment of the present invention;

FIGS. 12A and 12B are a flowchart illustrating an information complementing and inquiring process performed in the second embodiment; and FIG. 13 is a diagram illustrating general arrangement of an input operation system of a modified example of the first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

An input operation system of a first embodiment of the present invention will be described as an application example of an information processing system, an information processing method, and an information processing apparatus of the present invention.

An overview of the input operation system will be described.

Figure 1:
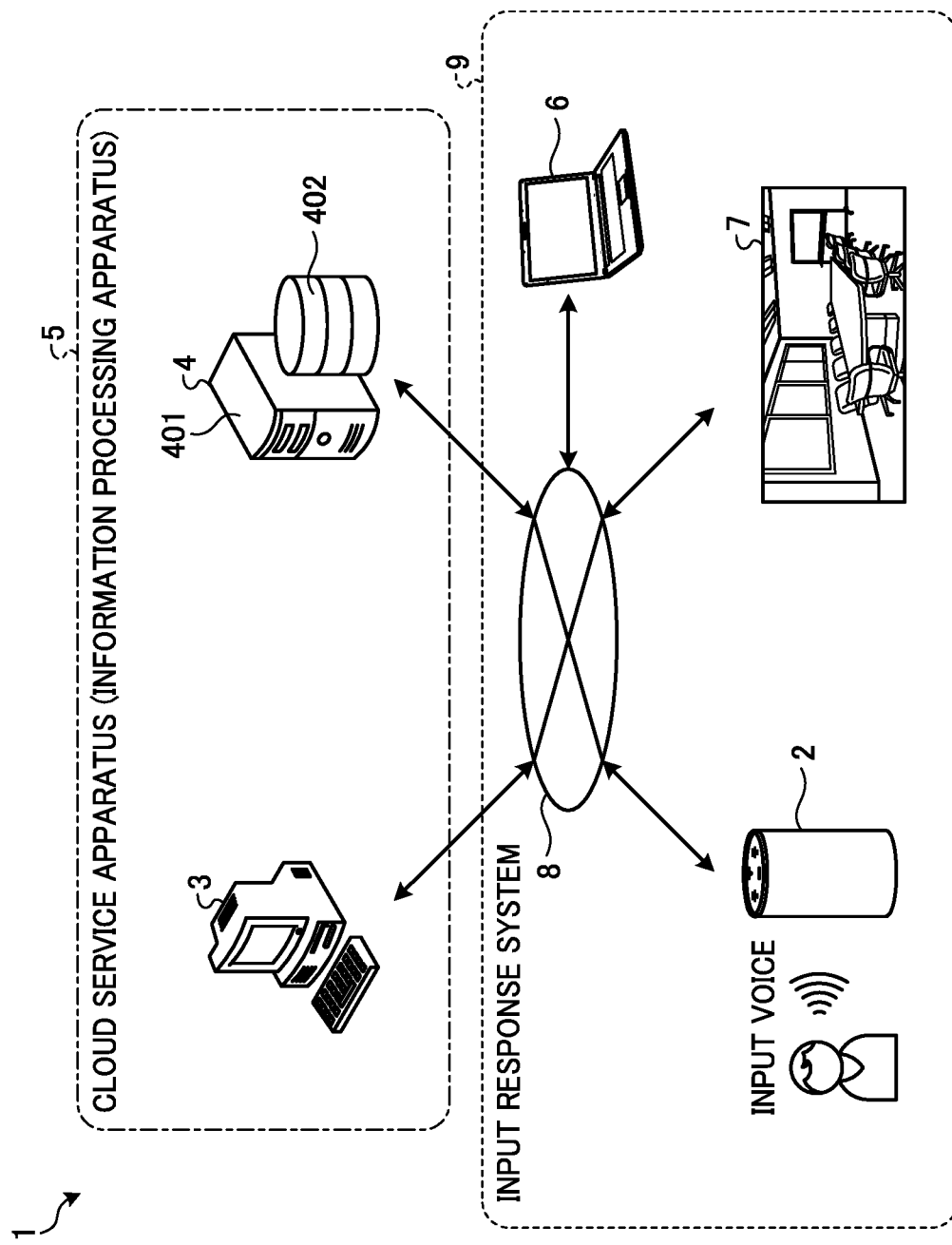
FIG. 1 is a diagram illustrating general arrangement of an input operation system of a first embodiment of the present invention.

FIG. 1 is a diagram illustrating general arrangement of an input operation system 1 of the first embodiment. As illustrated in FIG. 1, the input operation system 1 of the first embodiment includes at least one smart speaker 2, an information recognition server 3, an artificial intelligence (AI) assistant server 4, a management apparatus 6, and at least one meeting room 7, which are connected to each other via a network 8 such as a local area network (LAN), for example.

The smart speaker 2 is an AI-equipped device that, in response to voice input, enables a user to listen to or view various content such as music and video, weather forecasts, and news, for example. The smart speaker 2 further has a function of remote-controlling various apparatuses such as a lighting apparatus and a household appliance.

The information recognition server 3 has a function of receiving audio information obtained by the smart speaker 2, converting the audio information into text data, and converting the text data into data representing the intention of the user. The AI assistant server 4 has a function of cooperating with the information recognition server 3 to process the audio information acquired from the smart speaker 2. The AI assistant server 4 is connected to the information recognition server 3 via the network 8, forming a cloud service apparatus 5. The cloud service apparatus 5, in which the information recognition server 3 and the AI assistant server 4 are connected to each other via the network 8, or the AI assistant server 4 generates a command to the meeting room 7 such as a reservation execution command or a command to execute a predetermined process (hereinafter referred to as the predetermined process execution command), and transmits the command from the AI assistant server 4 to the management apparatus 6. The meeting room 7 is an example of an external resource. The management apparatus 6 receives the command generated in the cloud service apparatus 5 (or the AI assistant server 4), such as the predetermined process execution command, and manages management information representing the reservation statuses of external resources. The management apparatus 6 further executes the predetermined process on the meeting room 7.

The at least one smart speaker 2 is an example of an information input device. The cloud service apparatus 5 is an example of an information processing apparatus. The input operation system 1 is an example of an information processing system.

The network 8 may be implemented as a wired or wireless LAN. The smart speaker 2 is a speaker with an AI assistant function compatible with an interactive voice input operation, for example, and serves as an apparatus that recognizes sound and image with a built-in microphone and a built-in camera, for example, and performs operations such as retrieving information and operating a household appliance connected to the smart speaker 2. The input operation system 1 may include two or more smart speakers 2. In the following description, the term "external resources" refers to various elements managed and used in a system or network, i.e., control targets including an event space facility (hereinafter simply referred to as the space facility) such as a meeting room, an electronic apparatus, and a shared facility or equipment, for example.

The smart speaker 2 receives a voice input operation with an utterance from a user. The smart speaker 2 further functions as an information input device in the input operation system 1 that transmits and executes the command to the external resource, such as the reservation execution command or the predetermined process execution command, based on information obtained through the voice input operation. Further, the smart speaker 2 transmits the audio data (hereinafter also referred to as the audio information) based on the received voice input operation to the information recognition server 3 (or the cloud service apparatus 5) via the network 8. The smart speaker 2 may also have a function of providing feedback to the user to complement the audio information obtained from the received voice input operation. In the present embodiment, a description will be given of a case in which, based on the above-described audio information, the predetermined process execution command is transmitted to a target apparatus that manages a target, i.e., the management apparatus 6 that manages the external resource.

The information recognition server 3 converts the audio information transmitted from the smart speaker 2 into text data. The information recognition server 3 corresponds to a first server. The AI assistant server 4 corresponds to a second server.

The functions of the cloud service apparatus 5 may be partially or fully included in the smart speaker 2 or the management apparatus 6. If all functions of the cloud service apparatus 5 are included in the smart speaker 2 or the management apparatus 6, the cloud service apparatus 5 may be removed from the input operation system 1. In this case, the smart speaker 2 may communicate with the management apparatus 6 not via the cloud service apparatus 5, and the input operation system 1 may form an input response system 9 including the smart speaker 2, the management apparatus 6, and the external resource (e.g., the meeting room 7). Further, the management apparatus 6 may be a reservation management server implemented by one or more servers, for example. In the present embodiment, the external resource such as the meeting room 7 is the target, information of which such as the use schedule of the meeting room 7 is managed by the management apparatus 6. In this case, the management apparatus 6 functions as the target apparatus. The external resource may be a space facility, such as a meeting room, equipped with a function of receiving and executing the command such as the predetermined process execution command not via the management apparatus 6, or may be an electronic apparatus such as a multifunction peripheral (MFP) or a projector. In this case, one or both of the management apparatus 6 and the external resource may function as the target apparatus.

In the example described above, the cloud service apparatus 5 includes the information recognition server 3 and the AI assistant server 4. The functions of the information recognition server 3, however, may be partially or fully included in the AI assistant server 4, or the functions of the AI assistant server 4 may be partially or fully included in the information recognition server 3. That is, the information recognition server 3 and the AI assistant server 4 may complement the functions of each other. Further, the cloud service apparatus 5 may be implemented by one server or by three or more servers.

The AI assistant server 4 stores a management database (DB) 401 and an association DB 402. The management DB 401 and the association DB 402 may be stored in a memory such as a hard disk drive (HDD) available on the network 8 to the cloud service apparatus 5, for example. Further, one or both of the management DB 401 and the association DB 402 may be stored in another server accessible to the cloud service apparatus 5 via the network 8.

The management DB 401 stores content (data) such as text data, image data, and audio data, for example, to be provided by the AI assistant server 4. Information managed in the management DB 401 may be changed or added with new information by the cloud service apparatus 5 or a client personal computer (PC) connected to the management DB 401 via the network 8, for example. The management DB 401 and the management apparatus 6 are illustrated as separate components in FIG. 1, but may be implemented by one server. In this case, the command to the management apparatus 6 such as the predetermined process execution command may be transmitted to the management DB 401 by a later-described management program to acquire various information managed in the management DB 401.

The association DB 402 stores, for example, a device identifier (ID) and an external resource ID in association with each other. The device ID is the ID of the information input device, i.e., the ID for identifying the corresponding smart speaker 2. The external resource ID is the ID of the external resource (e.g., the meeting room 7, which may be a meeting room MA or a meeting room MB, for example) associated with the smart speaker 2. Details of the association DB 402 will be described later.

For example, the AI assistant server 4 analyzes the intention of the user (e.g., the reservation execution command to the meeting room 7) converted from the text data by the information recognition server 3, and complements the information to be transmitted to the management apparatus 6 based on user information previously registered in the AI assistant server 4. The AI assistant server 4 transmits the converted reservation execution command to the management apparatus 6 via the network 8. The reservation execution command is generated based on a reservation instruction issued by the user via the smart speaker 2 through the voice input operation, for example.

In the illustrated example of the present embodiment, the management DB 401 and the association DB 402 are included in the AI assistant server 4. Alternatively, the management DB 401 and the association DB 402 may be provided outside the AI assistant server 4. Further, one of the management DB 401 and the association DB 402 may be included in the AI assistant server 4, and the other of the management DB 401 and the association DB 402 may be provided outside the AI assistant server 4.

For example, the management apparatus 6 stores and updates the management information, which represents the reservation status of the external resource, based on the reservation execution command to the external resource transmitted from the AI assistant server 4. Further, based on the management information, the management apparatus 6 executes the command such as the predetermined process execution command to the target such as the meeting room 7. The communication between the management apparatus 6 and the AI assistant server 4 (or the cloud service apparatus 5) takes place via the network 8.

The management apparatus 6, which also functions as the target apparatus, manages various external resources, for example. In the present embodiment, the various external resources include a facility resource such as a building or a space facility such as the meeting room 7. That is, the management apparatus 6 stores and manages information of each resource such as the management information representing the user having reserved the resource and the reservation time of the resource, for example. The management information stored and managed by the management apparatus 6 may be viewed and edited from a client PC connected to the management apparatus 6 via the network 8, for example. Further, the management information may be changed or added with new information, for example, by the client PC or the cloud service apparatus 5. That is, the management apparatus 6 may receive a reservation for an external resource from the client PC, for example, and edit the management information. If multiple reservations for the same external resource are received from the smart speaker 2 and the client PC, the management apparatus 6 edits the management information not to double-book the external resource. That is, the management information referred to by the AI assistant server 4 is identical with the management information referred to by the client PC.

It is assumed in the following description of the present embodiment that the two servers, i.e., the information recognition server 3 and the AI assistant server 4, are integrated as the cloud server apparatus 5, as described above. Each of the information recognition server 3 and the AI assistant server 4, however, may be implemented by a plurality of servers.

Hardware configurations of the apparatuses forming the input operation system 1 will be described.

A hardware configuration of the smart speaker 2 will be described.

Figure 2:
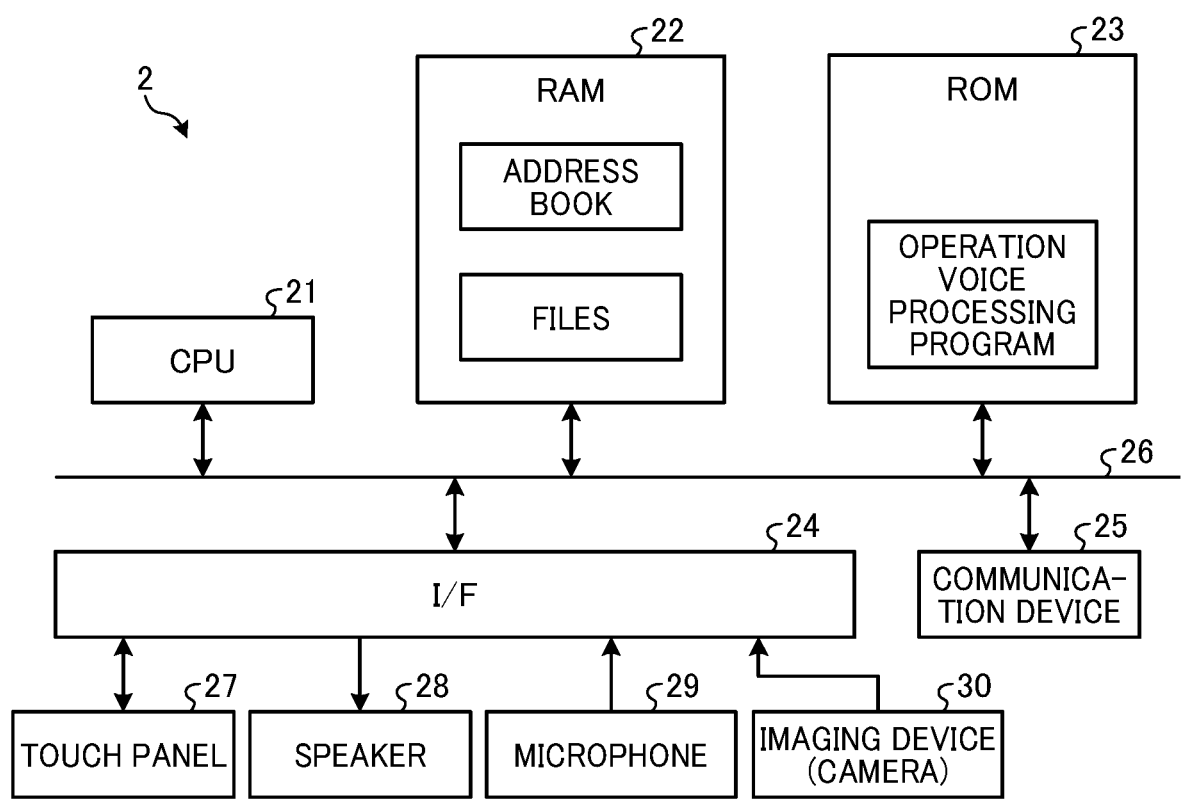
FIG. 2 is a diagram illustrating a hardware configuration of a smart speaker included in the input operation system of the first embodiment.

FIG. 2 is a diagram illustrating a hardware configuration of the smart speaker 2. As illustrated in FIG. 2, the smart speaker 2 includes hardware resources including a central processing unit (CPU) 21, a random access memory (RAM) 22, a read only memory (ROM) 23, an interface (I/F) 24, and a communication device 25, which are connected to each other via an internal bus 26.

The CPU 21 is a control device that performs overall control of the entire smart speaker 2.

The RAM 22 functions as a work area to which various programs stored in a memory such as the ROM 23, for example, are downloaded to allow the CPU 21 to execute various processes. The RAM 22 further stores an address book and files, for example.

The ROM 23 stores data forming an operation voice processing program and various other programs. The CPU 21 executes these processing programs to enable a process on the meeting room 7 to be performed through the voice input operation, for example. The CPU 21 further executes operations such as display control for displaying data acquired from the cloud service apparatus 5 on a touch panel 27, audio output control for providing feedback via a speaker 28, and image output control.

The I/F 24 is connected to the touch panel 27, the speaker 28, a microphone 29, and an imaging device 30 (e.g., a camera).

The communication device 25 transmits the information obtained through the voice input operation by the user, for example, to the information recognition server 3 via the network 8. The communication device 25 is also capable of communicating with another apparatus via the network 8 either in wired communication or in wireless communication.

The internal bus 26 is a general-purpose bus for connecting the CPU 21, the RAM 22, the ROM 23, the I/F 24, and the communication device 25 to each other. The internal bus 26 is not limited to a particular type of bus, and may be any type of bus commonly used in a general-purpose apparatus such as a smart speaker.

The touch panel 27 includes a liquid crystal display (LCD) and a touch sensor integrated together, for example. The user performs an operation such as touching a touch key disposed on the LCD of the touch panel 27 to specify a desired operation.

The speaker 28 provides the user with audio feedback with sound to prompt the user to input missing information, for example.

The microphone 29 acquires the audio information provided by the user to reserve the meeting room 7 through the voice input operation, for example. The acquired audio information is transmitted to the information recognition server 3 via the communication device 25 and converted into text data by the information recognition server 3.

The imaging device 30 captures the image of the user of the smart speaker 2 or another image. The captured image is transmitted to the information recognition server 3 via the communication device 25 as video or still image data (hereinafter simply referred to as the image data).

A hardware configuration of the information recognition server 3 will be described.

Figure 3:
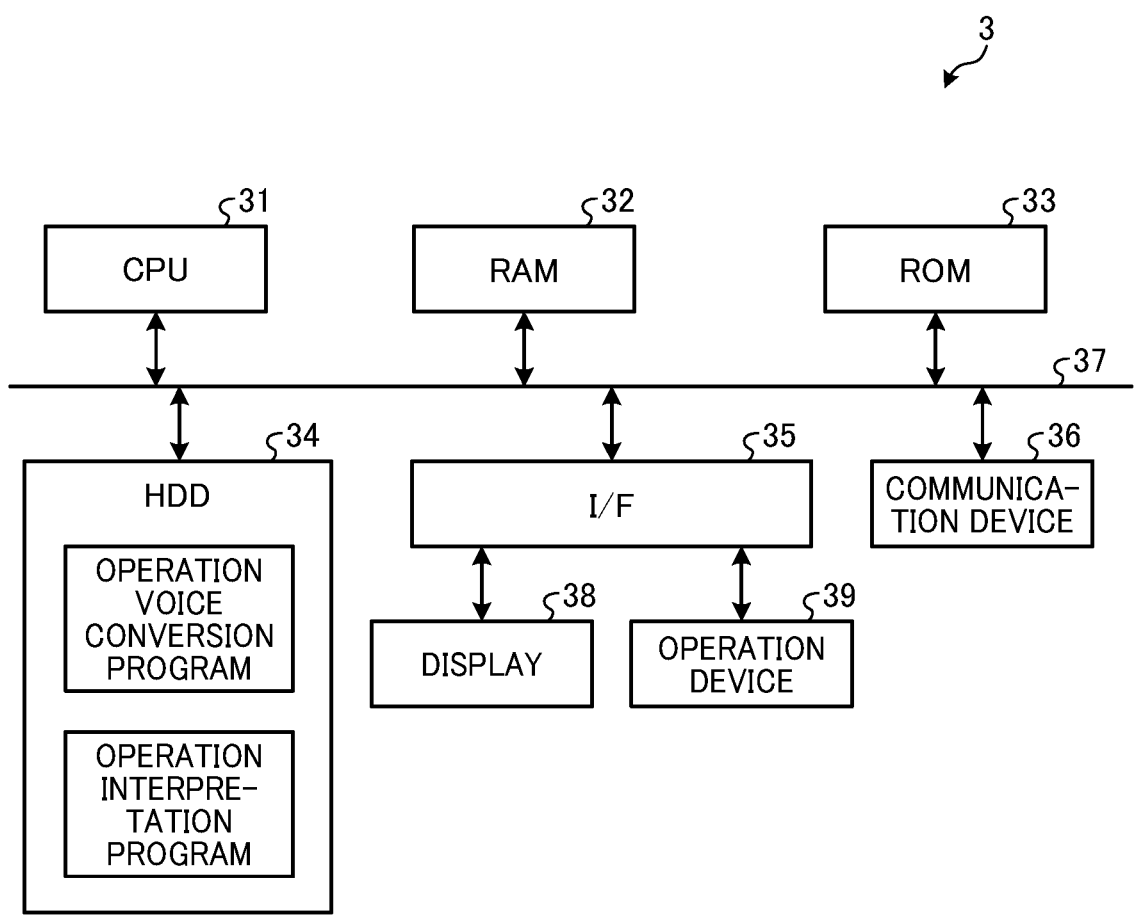
FIG. 3 is a diagram illustrating a hardware configuration of an information recognition server included in the input operation system of the first embodiment.

FIG. 3 is a diagram illustrating a hardware configuration of the information recognition server 3. As illustrated in FIG. 3, the information recognition server 3 includes hardware resources including a CPU 31, a RAM 32, a ROM 33, an HDD 34, an I/F 35, and a communication device 36, which are connected to each other via an internal bus 37. The I/F 35 is further connected to a display 38 and an operation device 39.

The HDD 34 stores data forming various programs including an operation voice conversion program and an operation interpretation program.

For example, the operation voice conversion program converts the audio information received from the smart speaker 2 into the text data. The operation voice conversion program then determines whether the converted text data matches previously defined dictionary information. If it is determined that the converted text data matches the dictionary information, the operation voice conversion program and the operation interpretation program convert the text data into intent representing the intention of the user and parameters representing variables of conditions for executing the predetermined process, for example. Then, with the operation voice conversion program and the operation interpretation program, the intent representing the intention of the user and the parameters representing the variables of the conditions for executing the predetermined process are transmitted to the AI assistant server 4.

The CPU 31 executes various programs including the operation voice conversion program. The CPU 31 executes the operation interpretation program for interpreting the contents of the instruction based on the audio information provided by the user, to thereby interpret the contents of the user instruction based on the text data generated (converted) by the information recognition server 3. That is, the information recognition server 3 functions as an apparatus that analyzes the contents of a particular instruction based on the audio information provided by the user.

The operation voice conversion program and the operation interpretation program may be executed by one server, by a plurality of different servers, or by a plurality of servers cooperating with each other.

The RAM 32 functions as a work area to which various programs stored in a memory such as the ROM 33, for example, are downloaded to allow the CPU 31 to execute various processes.

The ROM 33 stores data forming programs other than the various programs stored in the HDD 34. The CPU 31 may execute various programs stored in the ROM 33 to control the communication between the information recognition server 3 and the smart speaker 2 or the AI assistant server 4.

The communication device 36 receives, from the smart speaker 2, the audio information obtained through the voice input operation by the user, for example. The communication device 36 is also capable of communicating with another apparatus via the network 8 either in wired communication or in wireless communication.

The internal bus 37 is a general-purpose bus for connecting the CPU 31, the RAM 32, the ROM 33, the HDD 34, the I/F 35, and the communication device 36 to each other. The internal bus 37 is not limited to a particular type of bus, and may be any type of bus enabling the information recognition server 3 to function as a server.

The display 38 is implemented as an LCD, for example, to display various states of the information recognition server 3, for example.

The operation device 39 is implemented as a touch panel, for example, in which an LCD and a touch sensor are integrated together. To issue a command to execute a desired operation with the operation device 39, the user (i.e., operator) touches and operates an operation button (i.e., a software key) displayed on the operation device 39, for example, to thereby specify the desired operation.

The operation voice conversion program may be provided as recorded on a computer readable recording medium such as a compact disc ROM (CD-ROM) or a flexible disk (FD) in an installable or executable file format. Further, the operation voice conversion program may be provided as recorded on a computer readable recording medium such as a CD-recordable (CD-R), a digital versatile disk (DVD), a Blu-ray (registered trademark) disc, or a semiconductor memory. Further, the operation voice conversion program may be provided as installed in the information recognition server 3 via a network such as the Internet or as previously stored in a memory such as the ROM 33 of the information recognition server 3.

A hardware configuration of the AI assistant apparatus 4 will be described.

Figure 4:
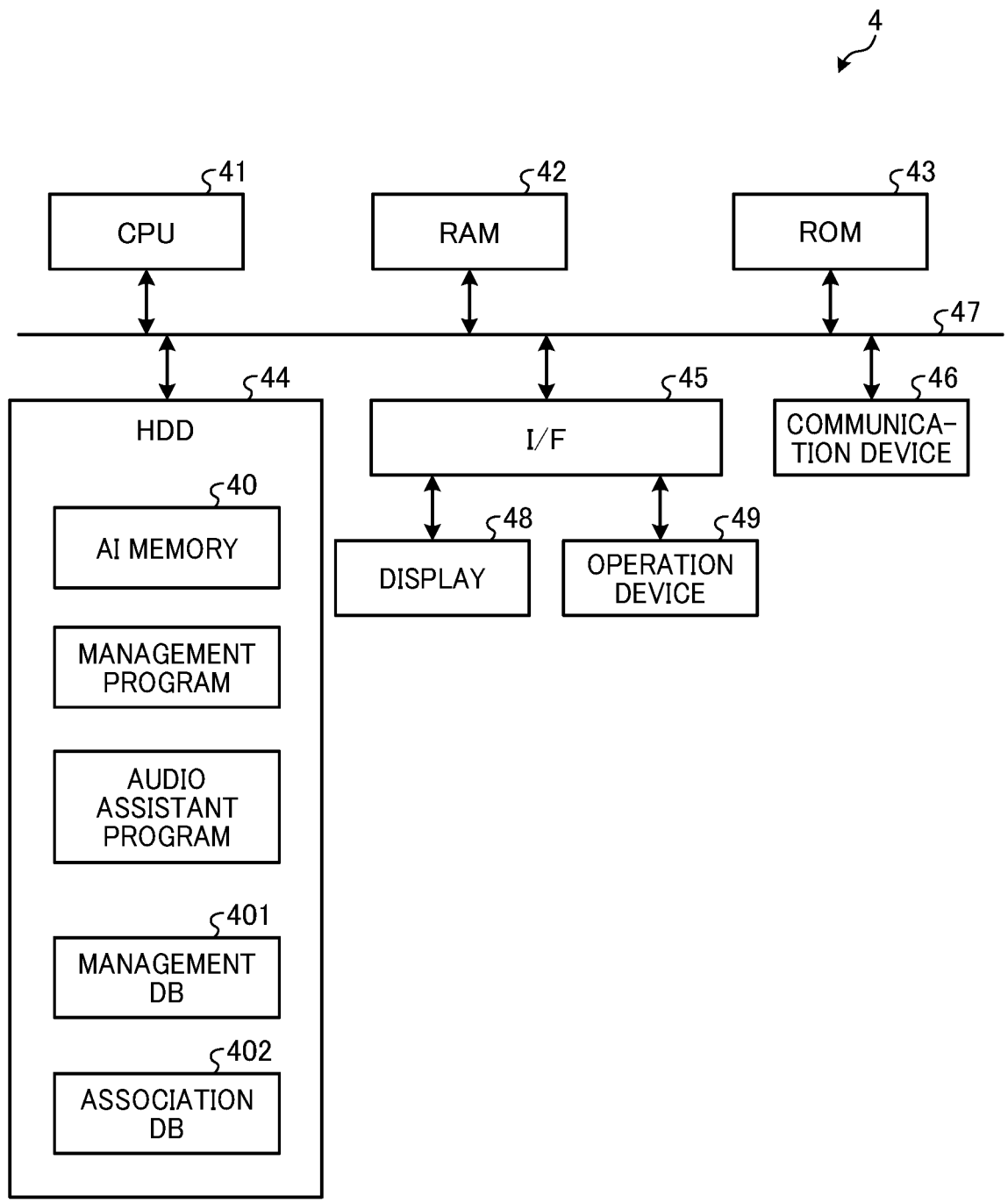
FIG. 4 is a diagram illustrating a hardware configuration of an artificial intelligence (AI) assistant server included in the input operation system of the first embodiment.

FIG. 4 is a diagram illustrating a hardware configuration of the AI assistant server 4. As illustrated in FIG. 4, the AI assistant apparatus 4 includes hardware resources including a CPU 41, a RAM 42, a ROM 43, an HDD 44, an I/F 45, and a communication device 46, which are connected to each other via an internal bus 47. The I/F 45 is further connected to a display 48 and an operation device 49.

The HDD 44 stores an AI memory 40 and data forming the management program, a voice assistant program, and the management DB 401 and the association DB 402 described above.

The management program is a program for transmitting, from the AI assistant server 4 to the target apparatus such as the management apparatus 6 or the external resource (e.g., an MFP), the data converted from the text data based on the intent and the parameters to be compatible with the target apparatus such as the management apparatus 6, for example.

With the operation voice conversion program executed in the information recognition server 3, the voice assistant program executes the process of converting the audio information provided by the user into the text data and interpreting the contents of the text data with the dictionary information, for example.

The AI memory 40 in the HDD 44 stores the dictionary information for interpreting the predetermined process execution command issued through the voice input operation by the user. The dictionary information includes entity information, intent information, and association information, which will be described later. The HDD 44 further stores a user management table 402a, a management apparatus association table 402b, and a resource management table 402c illustrated in FIGS. 5A, 5B, and 5C, respectively. The user management table 402a, the management apparatus association table 402b, and the resource management table 402c are previously provided with predetermined setting values, which may be changed or added with new values as necessary.

A description will be given of an overview of the user management table 402a, the management apparatus association table 402b, and the resource management table 402c, i.e., various table data managed in the association DB 402.

FIGS. 5A, 5B, and 5C are diagrams illustrating examples of the various table data managed in the association DB 402. A memory such as the HDD 44 of the AI assistant server 4 stores the association DB 402, which is implemented by the user management table 402a, the management apparatus association table 402b, and the resource management table 402c illustrated in FIGS. 5A, 5B, and 5C.

In the user management table 402a, user ID and user name are managed in association with each other for each device ID of an information input device (i.e., smart speaker 2), for example. The user ID and the user name are examples of user identification information for identifying the user. The device ID of the information input device is an example of device identification information for identifying the information input device (i.e., the smart speaker 2 in the present example). The user ID and the user name are also information for identifying the user of the information input device. For example, if a reservation instruction is transmitted from the smart speaker 2 with a device ID "ud1001," the device ID "ud1001" is associated with a user ID "r0001" of the user of the smart speaker 2. If the user name or the user ID is obtainable from the smart speaker 2, the association DB 402 may not store the user management table 402a.

In the management apparatus association table 402b, management apparatus ID and connection information are managed in association with each other for each device ID of an information input device (i.e., smart speaker 2), for example. The management apparatus ID is information for identifying the management apparatus 6. If there are a plurality of services for managing the external resources, a desired service is selected therefrom by the user. That is, the AI assistant server 4 is capable of previously storing, in the management apparatus association table 402b, the smart speaker 2 used by the user and the management apparatus 6 providing the desired service in association with each other. For example, if the reservation instruction is transmitted from the smart speaker 2 with the device ID "ud1001," the device ID "ud1001" is associated with a management apparatus ID "k0001" of the management apparatus 6. Further, the connection information represents the address or the uniform resource locator (URL) as information for accessing the management apparatus 6. The connection information in this case is "AAAA," for example. The management apparatus association table 402b may additionally store account information and a password for accessing the management apparatus 6 in association with the above-described information items.

The resource management table 402c is an example of a data table managed in the association DB 402 used in the input operation system 1 as an example of the information processing system. An external resource ID of the external resource is an example of resource identification information for identifying the above-described external resource. Further, an external resource name is the name of the space facility or the electronic apparatus, for example, on which the reservation execution command or the predetermined process execution command from the smart speaker 2 used by the user is executed. The external resource name may be the name of a meeting room, a reception room, a car rental company, a taxi company, or a bike rental company, for example. An equipment resource ID of an equipment resource is an example of equipment resource identification information for identifying the equipment resource. An equipment resource name is the name of the equipment resource used with the external resource. The equipment resource name may be the name of a projector, an electronic interactive whiteboard (IWB), a networked television, a speaker, a child seat, or a dashboard camera, for example. In the resource management table 402c, the external resource ID, the external resource name, the equipment resource ID, and the equipment resource name are managed in association with each other for each device ID of an information input device (i.e., smart speaker 2).

For example, in the resource management table 402c, the external resource name and the external resource ID of the external resource corresponding to the reservation instruction transmitted from the smart speaker 2 with the device ID "ud1001" are "MEETING ROOM MA" and "r0001," respectively. Further, the equipment resource name of an equipment resource included in the meeting room MA is "PROJECTOR P1," and the equipment resource ID of the projector P1 is "ro0011." In the resource management table 402c, the above-described items are registered and managed in association with each other. In the resource management table 402c illustrated in FIG. 5C, the device ID of the information input device and the external resource ID of the external resource are associated with each other. That is, the device ID of each smart speaker 2, the external resource ID of the corresponding external resource, and the equipment resource ID of the equipment resource installed in the external resource are stored in the association DB 402 in association with each other to enable identification of the smart speaker 2, the external resource, and the equipment resource, for example. The types and values of the IDs illustrated in FIGS. 5A to 5C are illustrative and not exclusive. Further, the user ID of a new, unregistered user, the device ID of the information input device used by the new user, and the external resource ID of the external resource specified by the new user may be newly added to and registered in the resource management table 402c in association with each other.

Referring back to FIG. 4, the CPU 41 converts the interpretation result into data such as the reservation execution command or the predetermined process execution command to the external resource, and transmits the converted data to the management apparatus 6 via the network 8. The intention of the user instruction includes a command to reserve the external resource such as a meeting room, a command to lock or unlock the external resource such as a meeting room, a command to turn on or off a lighting apparatus, and the predetermined process execution command, for example. A particular request is thus transmitted to the management apparatus 6 based on the audio information input via the smart speaker 2.

The RAM 42 functions as a work area to which various programs stored in a memory such as the HDD 44, for example, are downloaded to allow the CPU 41 to execute various processes.

The ROM 43 stores data forming various programs other than the programs stored in the HDD 44, for example.

In the AI assistant server 4, the HDD 44 stores the management DB 401 and the association DB 402, as described above.

The management DB 401 stores, for example, data such as text data, image data, and audio data representing the content provided by the AI assistant server 4 as the cloud service apparatus 5.

On the assumption that a plurality of smart speakers 2 are used in the input operation system 1, for example, the association DB 402 stores, for each of the smart speakers 2, the device ID for identifying the smart speaker 2 and the management apparatus ID of the corresponding management apparatus 6 in association with each other, for example. Even if there are a plurality of management apparatuses 6, therefore, it is possible for the user of the smart speaker 2 to identify the management apparatus 6 used by the user and make a reservation for the external resource. It suffices if the association DB 402 has a function of enabling the identification of the management apparatus 6. For example, therefore, the management apparatus ID may be replaced by the information of the URL for accessing the management apparatus 6.

The communication device 46 transmits and receives data to and from the information recognition server 3 or the management apparatus 6 via the network 8. The communication device 46 is also capable of communicating with another apparatus via the network 8 either in wired communication or in wireless communication.

The internal bus 47 is a general-purpose bus for connecting the CPU 41, the RAM 42, the ROM 43, the HDD 44, the I/F 45, and the communication device 46 to each other. The internal bus 47 is not limited to a particular type of bus, and may be any type of bus enabling the AI assistant server 4 to function as a server.

The display 48 is implemented as an LCD, for example, to display various states of the AI assistant server 4, for example.

The operation device 49 is implemented as a touch panel, for example, in which an LCD and a touch sensor are integrated together. To issue a command to execute a desired operation with the operation device 49, the user (i.e., operator) touches and operates an operation button (i.e., a software key) displayed on the operation device 49, for example, to thereby specify the desired operation.

A hardware configuration of the cloud service apparatus 5 will be described.

As described above, the cloud service apparatus 5 integrates the information recognition server 3 and the AI assistant server 4, for example, and is connected to the smart speaker 2 and the management apparatus 6 via the network 8. The hardware components forming the cloud service apparatus 5 therefore correspond to the above-described hardware components of the information recognition server 3 and the AI assistant server 4.

A hardware configuration of the management apparatus 6 will be described.

FIG. 6 is a diagram illustrating a hardware configuration of the management apparatus 6. As illustrated in FIG. 6, the management apparatus 6 includes hardware resources including a CPU 61, a RAM 62, a ROM 63, an HDD 64, an I/F 65, and a communication device 66, which are connected to each other via an internal bus 67. The I/F 65 is further connected to a display 68 and an operation device 69.

The CPU 61 is a control device that performs overall control of the entire management apparatus 6.

The RAM 62 functions as a work area to which various programs stored in a memory such as the ROM 63, for example, are downloaded to allow the CPU 61 to execute various processes.

The ROM 63 stores data forming a program that controls the management apparatus 6, for example. The CPU 61 executes the program that controls the management apparatus 6, to thereby control the communication between the management apparatus 6 and the cloud service apparatus 5 (or the AI assistant server 4), for example.

The HDD 64 stores data forming a command execution program. The CPU 61 executes the command execution program to execute the process of reserving the meeting room 7 (an example of the external resource), for example. The HDD 64 further stores the management information representing the reservation statuses of external resources.

The communication device 66 receives a command such as the predetermined process execution command from the cloud service apparatus 5 (or the AI assistant server 4). The communication device 66 further transmits the command such as the predetermined process execution command to the target apparatus via the network 8.

The internal bus 67 is a general-purpose bus for connecting the CPU 61, the RAM 62, the ROM 63, the HDD 64, the I/F 65, and the communication device 66 to each other. The internal bus 67 is not limited to a particular type of bus, and may be any type of bus enabling the management apparatus 6 to execute the command execution program.

The management information will be described in more detail.

FIGS. 7A and 7B are diagrams illustrating examples of the management information. A memory such as the HDD 64 of the management apparatus 6 stores a reservation management table 601, examples of which are illustrated in FIGS. 7A and 7B. The reservation management table 601 is an example of the management information. The management information may be generated from data forming the association DB 402 in the AI assistant server 4. FIG. 7A illustrates the reservation management table 601 as the management information managed in a management apparatus M1 (an example of the management apparatus 6). FIG. 7B illustrates the reservation management table 601 as the management information managed in a management apparatus M2 (an example of the management apparatus 6).

As illustrated in FIGS. 7A and 7B, the reservation statuses of external resources are included in the management information, in which each external resource type is assigned with a corresponding management apparatus 6. For each date and time slot, the information of whether the corresponding external resource is reserved and the information of the user having reserved the external resource are managed as the reservation status in association with information items such as the external resource ID and the user ID. For example, the management information illustrated in FIGS. 7A and 7B includes, for each date and time slot in which the external resource is reserved, the user ID and the user name of the user having reserved the external resource. For each date and time slot in which the external resource is not reserved, the management information includes text data "OPEN." The management information, however, is not limited to this configuration. For example, the management information may include the user ID but not the user name for each date and time slot in which the external resource is reserved. Further, the management information may include flag data associated with the external resource as the reservation target. Further, for each date and time slot in which the external resource is not reserved, the management information may include text data "-" or no data (i.e., a blank field). Further, for each date and time slot in which the external resource is reserved, the management information may include the execution command associated with the date and time slot. For example, according to the management information in FIG. 7A, the management apparatus M1 (an example of the management apparatus 6) requests the meeting room MA to activate an air-conditioning system installed in the meeting room MA at 9:00 on Jan. 1, 2019 and turn on the light and unlock the door of the meeting room MA at 10:00 on Jan. 1, 2019.

Further, the user ID of a new, unregistered user and the device ID of the information input device (i.e., the smart speaker 2) used by the new user may be newly added to and registered in the management information in association with each other.

A functional configuration of the input operation system 1 will be described.

FIGS. 8A and 8B are functional block diagrams of the apparatuses forming the input operation system 1 of the first embodiment. As illustrated in FIG. 1, the input operation system 1 includes the smart speaker 2, the information recognition server 3, the AI assistant server 4, the management apparatus 6, and the meeting room 7, which are connected to each other via the network 8. The information recognition server 3 and the AI assistant server 4 form the cloud service apparatus 5.

A functional configuration of the smart speaker 2 will be described.

The smart speaker 2 communicates data such as audio data, image data, or text data, for example, to and from the information recognition server 3 and the AI assistant server 4, which form the cloud service apparatus 5.

The CPU 21 of the smart speaker 2 illustrated in FIG. 2 deploys and executes, in the RAM 22, programs such as the operation voice processing program stored in a memory such as the ROM 23, to thereby implement functions or functional units including a communication control unit 251, an acquisition unit 252, a feedback unit 253, and a storing and reading unit 254.

The functions of the smart speaker 2 will be described.

The communication control unit 251 controls the communication between the smart speaker 2 and the information recognition server 3 or the cloud service apparatus 5 via the network 8 to transmit and receive various data or information therebetween. In this process, the communication control unit 251 controls the communication device 25 of the smart speaker 2 to transmit and receive the various data or information. The communication control unit 251 transmits, to the information recognition server 3 (or the cloud service apparatus 5), information based on, for example, a predetermined user operation or instruction to the smart speaker 2 acquired by the acquisition unit 252. The communication control unit 251 further acquires data such as text data, image data, or audio data from the cloud service apparatus 5 to provide feedback to the user. When transmitting the information related to the predetermined user operation or instruction to the information recognition server 3 (or the cloud service apparatus 5), the communication control unit 251 also transmits thereto the device ID for identifying the smart speaker 2.

As described above, the communication control unit 251 controls the communication with another apparatus connected to the smart speaker 2 via the network 8 such as a LAN. For example, a communication protocol such as Ethernet (registered trademark) commonly used in a LAN is used for a communication method of this communication. The communication control unit 251 is similar in function to a communication control unit included in each of the information recognition server 3, the AI assistant server 4, the cloud service apparatus 5, the management apparatus 6, and the meeting room 7 described later.

The acquisition unit 252 acquires instruction voice provided through the voice input operation by the user and collected via the microphone 29. The acquisition unit 252 may also acquire an instruction operation performed by the user, such as a tapping operation or an operation of pressing a physical switch. That is, the acquisition unit 252 acquires at least one of the information representing the instruction voice, the information representing the instruction operation, and the information representing any other predetermined instruction. Herein, the information representing a predetermined instruction corresponds to instruction information. The instruction voice of the user contains information for generating an execution command for reserving a certain external resource (e.g., the meeting room 7) or an execution command for executing a certain process, for example.

The acquisition unit 252 executes the above-described operation voice processing program to acquire the audio information provided by the user and transmit the acquired audio information to the information recognition server 3 (or the cloud service apparatus 5). Further, in cooperation with the feedback unit 253, the acquisition unit 252 displays the data (e.g., audio or text data) acquired from the cloud service apparatus 5 on the touch panel 27 or outputs the data as sound via the speaker 28 to notify the user of the feedback. The touch panel 27 may be integrated with or separated from the smart speaker 2. If the touch panel 27 is separated from the smart speaker 2, the touch panel 27 may be equipped with a wireless communication interface for use in wireless communication with the smart speaker 2, for example.

The feedback unit 253 functions to enable the smart speaker 2 to respond to the user as necessary when executing the reservation of the external resource or the predetermined process based on the audio information provided by the user. With the feedback unit 253, the present embodiment implements an interactive system. To implement the voice input operation in the interactive system, for example, the feedback unit 253 provides audio feedback to obtain missing data in response to the instruction based on the audio data provided by the user, for example. The feedback unit 253 may further provide the user with the text or audio data for feedback by displaying the data on a screen of the touch screen 27. The interactive operation and the feedback operation by the feedback unit 253 will be described in detail later.

The storing and reading unit 254 performs processes such as storing various data in the ROM 23 and reading various data of programs such as the operation voice processing program stored in the ROM 23, for example.

In the present embodiment, the communication control unit 251, the acquisition unit 252, the feedback unit 253, and the storing and reading unit 254 may be implemented by software. Further, the processes of these units may be partially executed by another program, or may be indirectly executed with another program. Further, these units may be partially or fully implemented by hardware such as an integrated circuit (IC).

A functional configuration of the information recognition server 3 will be described.

The information recognition server 3 analyzes the audio information received from the smart speaker 2, and converts the audio information into text data. The information recognition server 3 further interprets the intention of the user based on the text data and the dictionary information acquired from the AI assistant server 4, and transmits the interpretation result to the AI assistant server 4.

The CPU 31 of the information recognition server 3 deploys and executes, in the RAM 32, the operation voice conversion program stored in a memory such as the HDD 34 in accordance with the audio information provided by the user via the smart speaker 2. The CPU 31 executes the operation voice conversion program to implement functions or functional units including a communication control unit 351, an acquisition unit 352, a text conversion unit 353, an interpretation unit 354, an output unit 355, a providing unit 356, and a storing and reading unit 357, for example.

The functions of the information recognition server 3 will be described.

The communication control unit 351 controls the communication between the information recognition server 3 and the smart speaker 2 or the AI assistant server 4 via the network 8 to transmit and receive various data or information therebetween. Specifically, the communication control unit 351 controls the communication device 36 (see FIG. 3) of the information recognition server 3 to receive the audio data provided by the user and transmit the text data to the smart speaker 2, for example.

The acquisition unit 352 acquires the information based on the predetermined user operation or instruction transmitted from the smart speaker 2. The acquisition unit 352 may further acquire information based on a user operation performed on the touch panel 27, a button, or a switch of the smart speaker 2, for example.

The text conversion unit 353 converts the audio data provided by the user into the text data.

The interpretation unit 354 interprets the user instruction based on the text data. Specifically, based on the dictionary information provided by the voice assistant program executed by the AI assistant server 4, the interpretation unit 354 determines whether a word or phrase included in the text data matches the dictionary information. Then, if the word or phrase included in the text data matches the dictionary information, the interpretation unit 354 converts the text data into the intent representing the intention of the user and the parameters representing the variables of the conditions for executing the predetermined process, for example. The interpretation unit 354 transmits the intent and the parameters to the management program stored in a memory such as the HDD 44 of the AI assistant server 4. In this process, the interpretation unit 354 also transmits, to the AI assistant server 4, the device ID of the smart speaker 2 for identifying the device (i.e., the smart speaker 2) having acquired the audio data.

The output unit 355 controls the communication device 36 to transmit data such as text data, audio data, or image data to the smart speaker 2.

Further, the CPU 31 executes the operation voice conversion program stored in a memory such as the HDD 34, to thereby implement the function of the providing unit 356.

The storing and reading unit 357 performs a process of reading data forming various programs such as the operation voice conversion program stored in the ROM 33 or the HDD 34, for example.

In the present embodiment, the communication control unit 351, the acquisition unit 352, the text conversion unit 353, the interpretation unit 354, the output unit 355, the providing unit 356, and the storing and reading unit 357 may be implemented by software. Further, the processes of these units may be partially executed by another program, or may be indirectly executed with another program. For example, the functions of the interpretation unit 354 implemented by the execution of the operation voice conversion program may be partially or fully implemented by the execution of the voice assistant program. In these cases, processes such as the determination of whether the word or phrase included in the text data matches the dictionary information, and if so, the conversion of the text data into the intent representing the intention of the user and the parameters representing the variables of the conditions for executing the predetermined process, for example, may be executed by a voice assistant application program such as the voice assistant program. Further, the interpretation unit 354 may acquire the intent and the parameters from the voice assistant program, for example. Further, the above-described units of the information recognition server 3 may be partially or fully implemented by hardware such as an IC.

In the above-described example, the providing unit 356 is implemented by software. The providing unit 356, however, may be partially or fully implemented by hardware such as an IC similarly to the other units described above.

A functional configuration of the AI assistant server 4 will be described.

The AI assistant server 4 executes the processes of functions described below by acquiring information such as the device ID of the smart speaker 2 and the intent and the parameters obtained by programs such as the operation voice conversion program executed by the information recognition server 3, for example.

The AI assistant server 4 further converts the interpretation result received from the information recognition server 3 into data such as the reservation execution command to the external resource in a format compatible with the management apparatus 6. Then, the AI assistant server 4 transmits the converted data such as the reservation execution command to the management apparatus 6 as the target apparatus. The external resource such as the meeting room 7 executes the predetermined process in accordance with the data such as the reservation execution command transmitted from the management apparatus 6. As well as transmitting the reservation execution command to the management apparatus 6, the AI assistant server 4 may transmit, to the management apparatus 6 managing various external resources, commands to execute processes in the various external resources such as the meeting room 7, for example.

The CPU 41 of the AI assistant server 4 deploys and executes, in the RAM 42, the management program stored in a memory such as the HDD 44. The CPU 41 executes the management program to implement functions or functional units including a communication control unit 451, an acquisition unit 452, an interpretation result conversion unit 453, a complementing unit 454, an execution instruction unit 455, an execution determination unit 456, an apparatus information acquisition unit 457, a notification unit 458, a management unit 459, a retrieval unit 460, and a storing and reading unit 461, for example.

The functions of the AI assistant server 4 will be described.

The communication control unit 451 controls the communication device 46 (see FIG. 4) to perform processes such as transmitting the interpretation result to the smart speaker 2 used by the user and receiving the text data based on the audio data provided by the user, for example.

The acquisition unit 452 acquires information such as the intent and the parameters transmitted from the information recognition server 3 and the device ID of the smart speaker 2 (i.e., the information input device).

The interpretation result conversion unit 453 converts the interpretation result such as the intent and the parameters converted by programs such as the operation voice conversion program into a command such as the reservation execution command or the predetermined process execution command comparable with the management apparatus 6 as the target apparatus. The interpretation result conversion unit 453 is one of the functions of the management program executed by the AI assistant server 4. The reservation execution command or the predetermined process execution command compatible with the management apparatus 6 is an example of process information.

The complementing unit 454 has a function of complementing the information necessary for reserving the meeting room 7 by referring to at least one of the user management table 402*a*, the management apparatus association table 402*b*, and the resource management table 402*c* in response to the command such as the execution command converted by the interpretation result conversion unit 453. The information necessary for reserving the meeting room 7 is information necessary for converting the interpretation result into the reservation execution command to the meeting room 7, for example.

The execution instruction unit 455 transmits the command converted by the interpretation result conversion unit 453 such as the reservation execution command or the predetermined process execution command to the target apparatus that manages the external resource (e.g., the management apparatus 6), to thereby instruct the target apparatus to execute the command. That is, the execution instruction unit 455 retrieves, from the association DB 402, the management apparatus 6 associated with the device ID for identifying the smart speaker 2 used by the user, and transmits the command such as the reservation execution command or the predetermined process execution command to the management apparatus 6 together with the intent and the parameters. The execution instruction unit 455 may further retrieve, from the association DB 402, the meeting room 7 associated with the device ID for identifying the smart speaker 2 used by the user, and may transmit the command such as the reservation execution command or the predetermined process execution command to the management apparatus 6 that manages the meeting room 7 together with the intent and the parameters.

The apparatus information acquisition unit 457 acquires apparatus information representing states such as a connection state indicating whether communication connection is established between the management apparatus 6 and the meeting room 7, a power usage state related to ON and OFF of the power supply of the meeting room 7, and a locked state or an unlocked state of the door of the meeting room 7, for example. The apparatus information acquisition unit 457 stores and manages the apparatus information acquired from each of external resources including the meeting room 7 in a memory such as the HDD 44 in association with information such as the external resource ID for identifying the external resource. The storage location of the apparatus information may be one of the user management table 402*a*, the management apparatus association table 402*b*, and the resource management table 402*c*, which form the association DB 402, and the reservation management table 601 stored and managed in the management apparatus 6. The information acquired by the apparatus information acquisition unit 457 may be stored in the HDD 64 of the management apparatus 6. Further, the apparatus information acquisition unit 457 may be included in the management apparatus 6.

The execution determination unit 456 compares the state of the meeting room 7 represented by the acquired apparatus information with the contents of the reservation instruction or the predetermined process specified by the user, to thereby determine whether the user-specified reservation instruction or the predetermined process execution command is executable in the meeting room 7. The contents of the reservation instruction or the predetermined process specified by the user may be a command to execute a process of determining whether the meeting room 7 is available for use in a time slot specified by the user, a process of issuing a predetermined card for unlocking the meeting room 7, or a process of adjusting the lighting and air-conditioning in the meeting room 7 in accordance with the number of participants who will use the meeting room 7, for example.

If it is determined that the user-specified reservation instruction or the predetermined process execution command is executable in the meeting room 7, the execution determination unit 456 transmits the reservation execution command or the predetermined process execution command to the management apparatus 6 that manages the meeting room 7. In this case, the user may access the management apparatus 6 and locally, i.e., directly perform a process or action such as unlocking the meeting room 7, for example, in accordance with the predetermined process execution command.

If it is determined that the reservation execution command or the predetermined process execution command specified by the user is inexecutable in the meeting room 7, on the other hand, the execution determination unit 456 feeds back response information such as an error message to the smart speaker 2 via a program such as the operation voice conversion program.

In the present embodiment, if the external resource is an electronic apparatus such as an MFP, the execution determination unit 456 may directly transmit the command such as the predetermined process execution command to the MFP via the network 8 without via the management apparatus 6. The execution determination unit 456 may be included in the management apparatus 6. In this case, the electronic apparatus such as the MFP functions as the target apparatus, as described above.

The notification unit 458 transmits data such as text data, audio data, or image data to a program such as the operation voice conversion program as a response to the user-specified reservation instruction or the predetermined process execution command. If any of the parameters representing the instruction to reserve the external resource, the command for executing the predetermined process, or the conditions for executing the predetermined process is missing, the notification unit 458 transmits feedback to the smart speaker 2 via a program such as the operation voice conversion program. That is, the notification unit 458 prompts the user to input the missing parameter.

Herein, the notification unit 458 may transmit predetermined parameter information to the smart speaker 2 as information for checking the missing parameter, or may transmit data such as text data, audio data, or image data to the smart speaker 2 as information for prompting the user to specify the parameter. With the above-described process, the user is able to recognize the missing information based on the sound output from the smart speaker 2, for example.

Based on information input to a client device connected to the management apparatus 6, the smart speaker 2, or the cloud service apparatus 5, the management unit 459 registers the device ID of the smart speaker 2 and the external resource ID of the meeting room 7 managed by the management apparatus 6 in the association DB 402 in association with each other. In the association DB 402, information associating items such as the device ID of the smart speaker 2 and the external resource ID of the meeting room 7 with each other is stored and managed as the management information. If the management information is stored and managed in the management apparatus 6, however, the AI assistant server 4 does not require the management unit 459.

The retrieval unit 460 retrieves and identifies the management apparatus 6 or the external resource based on the device ID or the user ID.

The storing and reading unit 461 performs processes such as reading various data stored in a memory such as the HDD 44 of the AI assistant server 4 and writing various data to a memory such as the HDD 44.

In the present embodiment, the communication control unit 451, the acquisition unit 452, the interpretation result conversion unit 453, the complementing unit 454, the execution instruction unit 455, the execution determination unit 456, the apparatus information acquisition unit 457, the notification unit 458, the management unit 459, the retrieval unit 460, and the storing and reading unit 461 are implemented by software. These units, however, may be partially or fully implemented by hardware such as an IC. Further, the processes of the functions implemented by these units may be partially executed by another program stored in a memory such as the HDD 34 of the information recognition server 3, or may be indirectly executed with another program.

The interpretation operation executed by the cloud service apparatus 5 will be described in detail.

As described above, the cloud service apparatus 5 is an apparatus integrating the information recognition server 3 and the AI assistant server 4. The cloud service apparatus 5 also functions as one server. A memory such as the HDD 44 of the AI assistant server 4 forming the cloud service apparatus 5 stores the dictionary information. Based on the dictionary information, the operation voice conversion program generates the intent and the parameters. More specifically, the operation voice conversion program determines whether the word or phrase included in the text data converted from the audio information (i.e., audio data) obtained from the user utterance matches the dictionary information. If the word or phrase included in the text data matches the dictionary information, the operation voice conversion program generates the interpretation result including the intent and the parameters defined by the dictionary information.

The above-described dictionary information may be any form of information enabling the generation of the intent and the parameters. The dictionary information includes the entity information, the intent information, and the association information, for example.

The entity information associates a parameter for the external resource to execute the predetermined process with a natural language. It is possible to register a plurality of synonyms for one parameter.

The intent information represents the type of the predetermined process, as described above. The association information associates an utterance phrase uttered by the user in the natural language with the entity information, and associates the user utterance phrase with the intent information. The association information enables the information recognition server 3 (or the cloud service apparatus 5) to generate correct interpretation even if the order of utterance of the parameter or the nuance of the parameter is somewhat changed.

With the association information, the response text of the interpretation result may be generated based on the input data. Further, the association information may associate at least one of the entity information and the intent information with the utterance phrase.

As the entity information, each parameter and the corresponding synonyms are stored in association with each other. The synonyms are thus registered as well as the parameter. Therefore, when making a reservation for the meeting room MA, for example, an utterance "Hold the meeting room MA" and an utterance "Reserve the meeting room MA" are both settable as a parameter for executing the same process.

The interactive operation of the present embodiment will be described.

The input operation system 1 of the present embodiment implements the interactive operation with the interactive system that responds to the audio information provided by the user. As described above, this interactive operation is one of the operations executed by the feedback unit 253 of the smart speaker 2. As responses specifically to the audio information related to the reservation of the meeting room 7, the input operation system 1 provides two types of responses: input lack feedback and input confirmation feedback, as well as responses with fixed sentences for interaction. With these responses, the input operation system 1 implements an interactive system for operating the target apparatus, enabling the process of reserving the meeting room 7 through interaction.

The input lack feedback is a response output from the smart speaker 2 when the information necessary for reserving the meeting room 7 is incomplete. The input lack feedback is output from the smart speaker 2 when the audio information input by the user is not recognized or when an information item that should be input through an operation such as the voice input operation (hereinafter referred to as the necessary parameter) is missing. That is, it is unnecessary to provide the user with the input lack feedback when an item other than the necessary parameter (hereinafter also referred to as the regular parameter) is not specified by the user. Further, the input lack feedback may be used not only to check with the user about the missing necessary parameter but also to check with the user about functions to be used in the reservation of the meeting room 7.

In the interactive operation, the functions and parameters to be checked with the user may be changed by the feedback unit 253 depending on the type of the external resource. In this case, the apparatus information acquisition unit 457 of the AI assistant server 4 acquires information representing the type and functions of the external resource at a predetermined time after the communication with the external resource is established. Based on the acquired information, the apparatus information acquisition unit 457 may then determine the functions and the parameters to be checked with the user by the feedback unit 253.

For example, when the type of the external resource is the meeting room 7, the feedback unit 253 may check with the user about the items that should be input to reserve the meeting room 7 (e.g., the user name and the date and time of use). The feedback unit 253 may further check with the user about the information of the equipment resource to be used in the meeting room 7, for example. Further, the apparatus information acquisition unit 457 may change the necessary parameters in accordance with the condition specified by the user. For example, if the reservation condition specified by the user is the date and time of use, the apparatus information acquisition unit 457 may set a specific time slot representing the date and time of using the meeting room 7 as a necessary parameter, and may set the temperature of the air-conditioning system in the meeting room 7 as a regular parameter (i.e., non-necessary parameter).

The input confirmation feedback is a response output when the information necessary for reserving the meeting room 7 is complete. That is, the input confirmation feedback is output when all necessary parameters are specified. Further, the input confirmation feedback is output to prompt the user to select between executing the reservation process with the current setting values and changing the setting values. With the input confirmation feedback, the apparatus information acquisition unit 457 may check with the user about all parameters to confirm whether to execute the reservation process with the current setting values of the parameters. In this case, each of the parameters specified by the user is checked regardless of whether the parameter is a necessary parameter or not.

In the above-described example, the feedback unit 253 of the smart speaker 2 outputs the text data or the audio data included in the response information received from the AI assistant server 4. Alternatively, the feedback unit 253 may generate the text data corresponding to the response information based on the text data stored in a memory such as the ROM 23 of the smart speaker 2, and may output the generated data as audio or text feedback. Specific contents of the feedback will be described later.

A functional configuration of the management apparatus 6 will be described.

The management apparatus 6 cooperates with the cloud service apparatus 5 (or the AI assistant server 4) to execute processes such as the reservation of the meeting room 7 and the equipment resource to be used in the meeting room 7 and the predetermined process. The management apparatus 6, however, may not necessarily execute a process related to the equipment resource.

The CPU 61 of the management apparatus 6 deploys and executes, in the RAM 62, the command execution program stored in a memory such as the HDD 64, to thereby implement functions or functional units including a communication control unit 651, a command receiving unit 652, a retrieval unit 653, a reservation execution unit 654, a notification unit 655, and a storing and reading unit 656, for example.

The functions of the management apparatus 6 will be described.

The communication control unit 651 communicates with the communication control unit 451 of the AI assistant server 4 or the meeting room 7 via the network 8. The communication control unit 651 may also directly communicate with the communication control unit 251 of the smart speaker 2 or the client PC connected to the management apparatus 6 via the network 8.

The command receiving unit 652 acquires a predetermined command such as a reservation execution command or a reservation cancellation command transmitted from the execution instruction unit 455 of the AI assistant server 4 to the meeting room 7, and forwards the command to the reservation execution unit 654. The command receiving unit 652 further receives a reservation status check command transmitted from the execution instruction unit 455 of the AI assistant server 4 to check the reservation status of the meeting room 7, for example, and forwards the reservation status check command to the retrieval unit 653.

In response to receipt of the reservation status check command by the command receiving unit 652, the retrieval unit 653 retrieves the reservation status stored in a memory such as the HDD 64 based on conditions included in the reservation status check command (e.g., the external resource name, the external resource ID, the installation location of the external resource, the user name, and the user ID). The reservation status check command may be based on an utterance "Tell me the dates and times when the meeting room MA is available" as an example of an inquiry about the availability status of the meeting room 7 or an utterance "Tell me the dates and times when the meeting room 7 is reserved" as an example of an inquiry for checking the dates and times when the meeting room 7 has already been reserved. If the reservation status check command requests to check the availability status of a specific meeting room (e.g., the meeting room MA), the retrieval unit 653 retrieves the management information stored in a memory such as the HDD 64 in association with the meeting room MA, to thereby extract, from management information, the dates and times when the meeting room MA is not reserved.

In response to receipt of the reservation execution command by the command receiving unit 652, for example, the reservation execution unit 654 updates the reservation status, i.e., the management information, stored in a memory such as the HDD 64 based on the conditions included in the reservation execution command (e.g., the external resource name, the location of the external resource, and the user). If the external resource specified by the user has already been reserved for the date and time specified by the user, for example, the reservation execution unit 654 outputs an error notification without executing the reservation process. However, the response of the reservation execution unit 654 is not limited thereto; the reservation execution unit 654 may overwrite the existing reservation with a new reservation. The error notification is transmitted to the smart speaker 2 via the cloud service apparatus 5 or directly from the management apparatus 6. In response to receipt of the reservation cancellation command by the command receiving unit 652, the reservation execution unit 654 deletes, from the memory, the reservation of the external resource matching the conditions included in the reservation cancellation command. The reservation execution unit 654 is an example of an execution unit that executes a process such as the reservation process based on the contents of the instruction to reserve the meeting room 7 or the instruction to execute the predetermined process, which is provided through the voice input operation performed on the smart speaker 2 by the user, for example.

The notification unit 655 determines, based on a predetermined condition, whether to transmit a notification to the meeting room 7 or the smart speaker 2. Further, at the reservation time of the meeting room 7 or a predetermined time before the reservation time, the notification unit 655 transmits various notifications to the meeting room 7. If the external resource is a meeting room, the notifications are related to the unlocking of the door of the meeting room and the activation of the lighting apparatus and the air-conditioning system, for example. If the external resource is an apparatus such as an electronic apparatus (e.g., an MFP, a projector, an IWB, or a unified communication system (UCS)), the notifications include information related to the activation of the apparatus and the login to the apparatus, for example.

The notification unit 655 may transmit the notifications to the meeting room 7 upon receipt of the reservation from the user. In this case, the meeting room 7 may execute one of the above-described processes at the reservation time. Further, the notifications to the meeting room 7 may be included in the reservation execution command, or may previously be set in the management apparatus 6. Further, if duplication of reservation is found, or if a trouble (e.g., an equipment failure or repair work) occurs in the reserved meeting room 7 a predetermined time (e.g., ten minutes) before the reservation time, for example, the notification unit 655 may transmit a notification to the smart speaker 2 via the communication control unit 651 in the form of an electronic mail or an image, for example.

The storing and reading unit 656 controls a memory such as the HDD 64 to write and read various data to and from the memory.

In the present embodiment, the communication control unit 651, the command receiving unit 652, the retrieval unit 653, the reservation execution unit 654, the notification unit 655, and the storing and reading unit 656 are implemented by software. These units, however, may be partially or fully implemented by hardware such as an IC.

An overview of processes performed in the input operation system 1 will be described.

Based on an operation such as the voice input operation performed on the smart speaker 2 by the user, the input operation system 1 of the present embodiment executes a process such as the reservation of various external resources including the meeting room 7 or the execution of the predetermined process execution command to the target apparatus that manages the external resources. In this process, if any of the necessary parameters that should be input through the operation such as the voice input operation is not provided by the user, the input operation system 1 complements the missing necessary parameter (i.e., item) to manage the reservations of the various external resources or execute the predetermined process, for example.

As for the setting of the necessary parameters described above, the input operation system 1 may previously store, in a memory such as the HDD 44 of the AI assistant server 4, for example, table data indicating which ones of the parameters used to reserve the external resource or execute the predetermined process are the necessary parameters. In this case, the execution determination unit 456 of the AI assistant server 4 executes the feedback to the user as necessary based on the information of the necessary parameters stored as the table data. That is, based on the parameters acquired from the smart speaker 2, the complementing unit 454 determines whether all necessary parameters have been set. Then, if not all necessary parameters have been set, the complementing unit 454 complements the necessary parameters by referring to the table data. The information referred to here as the table data may be the user management table 402*a*, the management apparatus association table 402*b*, and the resource management table 402*c* stored in a memory such as the HDD 44 of the AI assistant server 4, or may be the management information stored in a memory such as the HDD 64 of the management apparatus 6. If the complementing unit 454 is unable to complement the necessary parameters even with reference to the table data, the complementing unit 454 and the execution determination unit 456 (or the execution determination unit 456 alone) function to prompt the user to input the missing information via the smart speaker 2.

An overview of the above-described processes will be described with reference to a specific example of the first embodiment given below.

The following description of the present embodiment will be given of an example in which the cloud service apparatus 5, which integrates the information recognition server 3 and the AI assistant server 4, manages and controls the external resource via the management apparatus 6 based on the audio information provided by the user.

FIG. 9 is a sequence chart illustrating a procedure of processes performed in the first embodiment. With reference to the sequence chart of FIG. 9, a description will be given of a case in which the user sends, via the smart speaker 2, a request to execute a process on a meeting room or a target apparatus. Specifically, in the following example of the first embodiment, the reservation of the meeting room MA (an example of the meeting room 7) is executed based on a user utterance. The processes in the sequence chart will be described.

Based on the voice input operation with a user utterance "Reserve the meeting room MA," the acquisition unit 252 of the smart speaker 2 first acquires the audio data (i.e., audio information) with the microphone 29 in FIG. 3, for example (step S101).

In the present embodiment, the utterance is not limited to the above example, and may be any utterance communicating a message for reserving the external resource. For example, in place of or in addition to an instruction to reserve a facility resource such as the meeting room 7, the utterance may include an instruction to reserve an equipment resource to be used in the meeting room 7. That is, the utterance may include an instruction to reserve a plurality of external resources at the same time.

Then, the acquisition unit 252 of the smart speaker 2 executes the operation voice processing program stored in a memory such as the ROM 23. In response to receipt of the audio data, the communication control unit 251 then transmits the audio data to the information recognition server 3 in accordance with the operation voice processing program. In this process, the communication control unit 251 also transmits the device ID for identifying the smart speaker 2 to the information recognition server 3 (step S102).

The device ID is an example of the information for identifying the device (i.e., the smart speaker 2) associated with the user of the device. For example, the user ID or the user name for identifying the user of the device or the information of an organization to which the user belongs may be transmitted in place of or in addition to the device ID.

Then, via the communication control unit 351, the acquisition unit 352 of the information recognition server 3 acquires the device ID and the audio data transmitted from the smart speaker 2. In this process, the information recognition server 3 executes a program such as the operation voice conversion program. The time at which the information recognition server 3 executes the program such as the operation voice conversion program, however, is not limited to the above-described time; the information recognition server 3 may execute the program at any other time.

The acquisition unit 352 may have the function of the acquisition unit 252 of the smart speaker 2 to obtain the audio information. In this case, the acquisition unit 352 has a function of acquiring, as well as the device ID of the smart speaker 2 and the user ID of the user, the instruction voice of the user collected via the microphone 29 of the smart speaker 2, for example. That is, the acquisition unit 352 may have both the function of step S101 and the function of step S102.

The text conversion unit 353 of the information recognition server 3 then converts the acquired audio data into text in accordance with the operation voice conversion program (step S103). In this process of converting the audio data into the text, information based on the voice input operation representing the utterance "Reserve the meeting room MA," for example, is converted into text data.

Then, the operation voice conversion program requests the voice assistant program executed by the AI assistant server 4 to transmit the dictionary information to the operation voice conversion program (step S104).

In response to receipt of the request transmitted from the information recognition server 3, the AI assistant server 4 executes the voice assistant program to read the dictionary information. Then, the voice assistant program provides the read dictionary information to the operation voice conversion program executed by the information recognition server 3 (step S105).

Programs such as the voice assistant program are stored in a memory such as the ROM 43 or the HDD 44 of the AI assistant server 4. However, the storage location of the programs is not limited thereto. For example, the AI assistant server 4 may download the voice assistant program from a memory such as the HDD 34 of the information recognition server 3 via the network 8 when executing the voice assistant program.

With programs such as the operation voice conversion program being executed in the information recognition server 3, the interpretation unit 354 interprets the text data converted from the audio data, to thereby generate the intent and the parameters. Specifically, the interpretation unit 354 determines, based on the dictionary information acquired from the voice assistant program, whether a word or phrase included in the text data matches the dictionary information. That is, the interpretation unit 354 interprets the text. If the word or phrase included in the text data matches the dictionary information, the interpretation unit 354 converts the text data into the intent representing the operation specified by the user and the parameters representing the variables of the conditions for executing the intended process. The above-described process of the interpretation unit 354 may be executed by the providing unit 356.

Herein, the intent is information representing the type of the process requested to the management apparatus 6, for example, and the parameters are information representing the settings of the process, for example. In the present embodiment, the intent is information for requesting the management apparatus 6 to execute the reservation of the external resource, and the parameters are information for identifying the external resource, such as the meeting room name or the apparatus name, and information related to the reservation of the external resource, such as the reservation date and time and the user of the external resource, for example. If the user instructs to reserve a plurality of external resources, the information for identifying the external resource may include a plurality of information items for identifying the plurality of external resources.

More specifically, the interpretation unit 354 generates information "INTENT: RESERVE" as the information related to the intent to reserve the meeting room 7, and generates information "EXTERNAL RESOURCE=MEETING ROOM MA" as the information related to a parameter for reserving the meeting room 7.

Based on the text data, the interpretation unit 354 thus generates the interpretation result representing the reservation request specified by the user, the type of the predetermined process (i.e., the intent), and the contents related to the predetermined process (i.e., the parameters), for example (step S106).

The interpretation unit 354 then transmits the generated intent and parameters and the device ID of the smart speaker 2 to the management program executed by the AI assistant server 4 (step S107).

Then, the cloud service apparatus 5 (or the AI assistant server 4) executes an information complementing and inquiring process (step S108).

A description will be given of an example of the information complementing and inquiring process executed by the cloud service apparatus 5 (or the AI assistant server 4).

Based on information such as the intent, the parameters, and the device ID of the smart speaker 2 acquired by the acquisition unit 452, the interpretation result conversion unit 453 of the AI assistant server 4 converts the interpretation result into data representing the reservation execution command to the meeting room 7. In this case, "RESERVE" and "MEETING ROOM MA" are provided as the intent to make a reservation and the parameter representing the location, respectively.

With the data converted by the interpretation result conversion unit 453, the retrieval unit 460 identifies the reservation target, i.e., the meeting room MA (an example of the meeting room 7), based on the device ID of the smart speaker 2 (i.e., the information input device) or the user ID of the user. Specifically, with reference to the management apparatus association table 402b, the retrieval unit 460 identifies the management apparatus ID and the connection information associated with the device ID of the smart speaker 2 (i.e., the information input device). The retrieval unit 460 then accesses the management apparatus 6 based on the identified connection information, to thereby refer to the management information and check the reservation status of the meeting room MA included in the management information.

Further, in response to the audio information provided by the user, the complementing unit 454 complements the information necessary for reserving the meeting room 7 by referring to the user management table 402a stored in the association DB 402 and the management information managed by the management apparatus 6. The complementing unit 454 may complement the information necessary for reserving the meeting room 7 by referring to the resource management table 402c stored in the association DB 402. If the complementing unit 454 is unable to complement the information necessary for generating the necessary parameters even with reference to the above-described tables, the complementing unit 454 may feed back to the user via the smart speaker 2 to prompt the user to input the information necessary for generating the necessary parameters. The above-described complementing process is executed by the complementing unit 454.

As illustrated in the resource management table 402c (see FIG. 5C), the management unit 459 is capable of previously registering the device ID or the user ID and the information of the meeting room MA (an example of the external resource) in the association DB 402 in association with each other. As a method of registering the user name or the user ID, the user may access the AI assistant server 4 via a PC, for example, to register the user name or the user ID in association with the device ID. As another method of registering the user name or the user ID, when a certain user uses the smart speaker 2, the user may issue an instruction to register the user name or the user ID of the user, and then may say the name of the user to the microphone 29 of the smart speaker 2. In this case, in response to receipt of the input of the user name with this utterance, the smart speaker 2 transmits, to the information recognition server 3, the audio information including the user name or the user ID as well as the device ID. Then, the management unit 459 of the AI assistant server 4 stores the acquired device ID and the text data of the user name or the user ID in the user management table 402a in association with each other. Instead of inputting the name of the user, the user may say the electronic mail address of the user, for example, to the microphone 29 of the smart speaker 2. Further, for example, a face photo of the user may be taken with the imaging device 30 of the smart speaker 2, and the captured image of the face photo may be compared with the user ID.

Then, based on the acquired intent and parameters, the apparatus information acquisition unit 457 determines whether the necessary parameters necessary for reserving the meeting room 7 are complete. Herein, the necessary parameters are the parameters received from the user and representing information for identifying the external resource as the reservation target and information of the reservation conditions. That is, the necessary parameters include parameters (i.e., conditions) such as the external resource as the reservation target, the user name of the user who makes the reservation, and the reservation date and time, for example. Further, the information as to which ones of the reservation conditions are the necessary parameters may previously be stored in a memory such as the HDD 44 of the AI assistant server 4, for example, and may be set as necessary. Further, each of the necessary parameters may be replaced with a regular parameter as necessary in accordance with the combination of the user and the external resource, for example. That is, a parameter defined as the necessary parameter in a certain condition may be managed as the regular parameter in another condition.

As described above, the complementing unit 454 complements the information necessary for generating the necessary parameters for reserving the meeting room MA by referring to the management information stored in the management apparatus 6 and the user management table 402a stored in the association DB 402, which includes the necessary parameters used to identify the external resource. If the resource management table 402c is stored in the association DB 402, the complementing unit 454 may refer to the resource management table 402c to complement the information necessary for generating the necessary parameters for reserving the meeting room MA. If the complementing unit 454 is unable to complement the information necessary for generating the necessary parameters even with reference to the above-described tables, the complementing unit 454 may feed back to the user via the smart speaker 2 to prompt the user to input the information necessary for generating the necessary parameters.

Based on the information complementing process, the execution determination unit 456 determines whether the necessary parameters are complete. If having determined that there is still a missing necessary parameter even with the data supplied by the information complementing process, the execution determination unit 456 inquires of the user about the necessary parameter via the notification unit 458. In this inquiry, information for the inquiry is transmitted to the smart speaker 2 from the cloud service apparatus 5 and provided to the user in sound, for example.

If there is a missing necessary parameter, the execution determination unit 456 continues the inquiry to the user via the smart speaker 2 to prompt the user to specify the necessary parameter until all necessary parameters are complete.

The information complementing and inquiring process will be described in more detail.

As an example of the information complementing and inquiring process executed at step S108, the complementing unit 454 complements the information representing the user of the external resource. If the information of the user who is going to use the external resource (e.g., the user ID) is not set by the user through an operation such as the voice input operation, the execution determination unit 456 determines whether the user is identifiable based on the device ID acquired from the smart speaker 2 at step S102. For example, the smart speaker 2 may be owned by a single user. In this case, it is possible for the user to previously register the device ID of the smart speaker 2 and the user name or the user ID of the user in the association DB 402 in association with each other. The execution determination unit 456 therefore determines whether the user name or the user ID associated with the device ID of the smart speaker 2 (i.e., the information input device) is registered in the user management table 402a of the association DB 402. That is, the execution determination unit 456 retrieves and identifies the user based on the device ID or the user ID.

If the execution determination unit 456 successfully identifies the user, the complementing unit 454 is able to set the identified user as a parameter representing the user of the external resource. That is, the complementing unit 454 complements the parameter by setting the user corresponding to the user name or the user ID associated with the device ID stored in the user management table 402a as the user of the external resource. If having failed to identify the user, the execution determination unit 456 may prompt the user to set the information of the user via the smart speaker 2. That is, to generate the data representing the predetermined process execution command (e.g., the reservation execution command), the execution determination unit 456 may communicate with the smart speaker 2 via the notification unit 458 and the communication control unit 451 to request the user to input the missing parameter. If the user name or the user ID is not registered, the complementing unit 454 may complement the information of user of the external resource with a predetermined default name or the device ID.

As another example of the information complementing and inquiring process executed at step S108, the complementing unit 454 complements a parameter representing the external resource name or the external resource ID. Further, if the information of the external resource is not set by the user through the voice input operation, the execution determination unit 456 determines whether the external resource is identifiable based on the device ID or the user ID acquired from the smart speaker 2 at step S102. For example, if the smart speaker 2 is installed in the meeting room 7, or if the smart speaker 2 per se is an equipment resource desired to be reserved, the execution determination unit 456 determines whether the external resource associated with the device ID or the user ID is registered in the resource management table 402c of the association DB 402.

Based on this determination, the retrieval unit 460 retrieves and identifies the external resource intended to be used (e.g., reserved). If the retrieval unit 460 successfully identifies the external resource, the complementing unit 454 sets the identified external resource as a parameter representing the external resource intended to be reserved. If having failed to identify the external resource, the retrieval unit 460 may cooperate with the notification unit 458 to request the user to set the information of the external resource via the smart speaker 2.

Even if the information of the external resource is set by the user through the operation such as the voice input operation, there may be a plurality of external resources having the same name as that of the set external resource. In this case, the execution determination unit 456 may determine whether the external resource is identifiable based on the device ID or the user ID in addition to the external resource name set through the operation such as the voice input operation. That is, the execution determination unit 456 in this case determines whether the external resource associated with the device ID or the user ID is registered in the association DB 402. Then, the retrieval unit 460 retrieves the external resource based on the device ID, the user ID, and the reservation management table 601 stored and managed in each of the management apparatuses 6 (e.g., the management apparatuses M1 and M2) as well as on the external resource name set through the operation such as the voice input operation, and identifies the intended external resource based on the retrieval result. If no available external resource (e.g., meeting room) is found in the identification of the external resource, the retrieval unit 460 may transmit an error message to the smart speaker 2.

If the external resource is identified by the retrieval unit 460, the management unit 459 sets the identified external resource as a parameter representing the reservation target. If the external resource is not identified by the retrieval unit 460, the management unit 459 may cooperate with the interpretation result conversion unit 453 and the execution determination unit 456 to request the user to set detailed information of the external resource via the smart speaker 2. That is, the interpretation result conversion unit 453 and the execution determination unit 456 may function as an acquisition control unit 462 (see FIG. 8B) that requests the smart speaker 2 to acquire information.

Relating to the above-described process of step S108, a description will be given of an example of the information complementing and inquiring process according to the management program executed in the cloud service apparatus 5 (more specifically, the AI assistant server 4).

FIGS. 10A and 10B are a flowchart illustrating the information complementing and inquiring process of the first embodiment. The process of complementing the information of the person who makes the reservation, i.e., the user of the external resource, and process of complementing the information of the external resource have been described above, and thus description thereof will be omitted below.

The acquisition unit 452 of the AI assistant server 4 forming the cloud service apparatus 5 first acquires data such as the intent, the parameters, and the device ID from the information recognition server 3 in the process of step S107 in FIG. 9 (step S1001).

Then, the interpretation result conversion unit 453 determines whether the user is identifiable based on the acquired data such as the intent, the parameters, and the device ID (step S1002). As an example of the method of identifying the user, whether the user name or the user ID is included as a parameter or whether the user is identifiable based on the user management table 402a may be determined. The above-described determination is executed by the interpretation result conversion unit 453 with reference to the user management table 402a stored in the association DB 402 illustrated in FIG. 5A, for example.

If it is determined that the user is identifiable based on the acquired data (YES at step S1002), the interpretation result conversion unit 453 determines, based on the acquired data, whether the reservation target is specified (step S1003). As an example of the method of determining whether the reservation target is specified, whether the external resource name or the external resource ID of the external resource is included as a parameter may be determined. The user utterance used in this determination may be "Reserve the meeting room MA," "Reserve this meeting room," or "Make a reservation," for example.

If it is determined that the reservation target is specified (YES at step S1003), the interpretation result conversion unit 453 determines, based on the acquired data, whether information such as the location of the external resource, the reservation time, and the reservation time slot is specified (step S1004). The user utterance used in this determination may be "Reserve the meeting room MA for 14:00 to 15:00," "Reserve the meeting room MA for one hour from now," or "Reserve the meeting room MA from now," for example.

If it is determined, based on the acquired data, that the information such as the reservation time is specified (YES at step S1004), the interpretation result conversion unit 453 determines whether the external resource as the reservation target is available for reservation (step S1005). The interpretation result conversion unit 453 determines whether the external resource is available for reservation by checking the current and future reservation status of the target external resource with clock information managed by the management program and the management information managed by the management apparatus 6, for example. More specifically, based on the device ID acquired from the smart speaker 2 and the management apparatus association table 402b, the interpretation result conversion unit 453 acquires the connection information for accessing the management apparatus 6. Then, the interpretation result conversion unit 453 accesses the management apparatus 6 based on the acquired connection information, and refers to the reservation management table 601 (i.e., the management information). The interpretation result conversion unit 453 may request the management apparatus 6 to transmit thereto the management information. Thereby, the execution determination unit 456 checks the reservation status of the reservation target. In the present example, the execution determination unit 456 checks the reservation status of the meeting room MA (i.e., the reservation target) in the management information, and if there is an available date and time of the meeting room MA matching the reservation time included as a parameter, the execution determination unit 456 determines that the reservation target is available for reservation. If there is no available date and time of the meeting room MA matching the reservation time included as a parameter, the execution determination unit 456 determines that the reservation target is unavailable for reservation. In the determination of whether the reservation time is specified, the interpretation result conversion unit 453 determines whether the reservation date and time is included in as a parameter.

If it is determined that the reservation target is available for reservation (YES at step S1005), the interpretation result conversion unit 453 determines information such as the reservation target (i.e., the external resource) and the reservation date and time based on the contents of the user utterance (step S1006).

The interpretation result conversion unit 453 converts the acquired data into the reservation execution command to the external resource (i.e., the meeting room MA) as the reservation target (step S1007), and the procedure is completed.

If it is determined that the user is not identifiable based on the acquired data (NO at step S1002), the interpretation result conversion unit 453 determines that the missing necessary parameter should be input. The interpretation result conversion unit 453 therefore cooperates with the notification unit 458 to request the smart speaker 2 to input the necessary parameter, i.e., the interpretation result conversion unit 453 executes the feedback process (step S1105), and the procedure returns to step S1001. The feedback to the user provided at step S1105 may be a message "Please enter your name" or "Please enter your ID," for example. The process of step S1105 executed by the management program to request the input of the necessary parameter (e.g., the user name, the device name, or the reservation target name) is repeated until the necessary parameter is supplied by the utterance of the user, for example.

If it is determined, based on the acquired data, that the reservation target is not specified (NO at step S1003), the interpretation result conversion unit 453 determines that the necessary parameter should be input. The interpretation result conversion unit 453 therefore cooperates with the notification unit 458 to request the smart speaker 2 to input the necessary parameter, i.e., the interpretation result conversion unit 453 executes the feedback process (step S1105), and the procedure returns to step S1001. The feedback process of step S1105 may be repeated until the intent and the parameters including the necessary parameters used to generate the reservation execution command or the predetermined process execution command are provided by the user.

If the user utterance is "Reserve the meeting room MA from now," for example, the interpretation result conversion unit 453 determines, based on the acquired data, that the reservation time is not specified (NO at step S1004). In this case, with a clock function of the CPU 401, for example, the interpretation result conversion unit 453 checks the current time set in the input operation system 1 (step S1101).

In the above utterance example, the information missing in the user utterance is the current time, for example. In the present embodiment, the information of the current time is complemented by the interpretation result conversion unit 453, which functions to generate the reservation execution command desired by the user, even if the user utterance does not contain information for generating the reservation execution command.

Then, the execution determination unit 456 checks the current time of the input operation system 1, and determines whether the external resource as the reservation target is available for reservation (step S1102).

If the external resource as the reservation target is available for reservation (YES at step S1102), the execution determination unit 456 determines the reservation end time of the external resource as the reservation target by adding the time available for using the external resource (e.g., one hour) to the current time (step S1103), and the procedure proceeds to step S1007. In the determination of the reservation end time, the execution determination unit 456 may check the reservation status of the meeting room MA based on the current time and the management information managed by the management apparatus 6, for example, to thereby determine the time until which, from the current time, the meeting room MA is available for use (i.e., reservation) to the user having provided the utterance. The method for the execution determination unit 456 to determine the availability or unavailability for reservation of a desired meeting room by referring to the management information is as described above. For example, however, the execution determination unit 456 may set the reservation date and time including the reservation start time and the reservation end time as a certain time period (e.g., one hour) starting from the current date and time (e.g., date, month, and year) indicated by a timer that manages date and time information of the input operation system 1. The certain time period may be calculated from the difference between the reservation time included in the reservation execution command issued by the user to reserve the external resource and the reservation time included in another reservation execution command issued by another user to reserve the same external resource. For example, according to the reservation management table 601 illustrated in FIG. 7A, the meeting room MA is reserved by a user with a user ID "u0010" from 11:00 to 12:00 on Jan. 1, 2019. In this example, the meeting room MA is reserved by another user from 12:00 on Jan. 1, 2019, and the one hour from 11:00 to 12:00 on Jan. 1, 2019 is calculated from the difference between the respective reservation start times of the two users.

If the external resource as the reservation target is unavailable for reservation (NO at step S1102), the execution determination unit 456 executes a process of changing the reservation target (step S1104). Herein, the information complementing process is executed. In this process of changing the reservation target, the execution determination unit 456 reserves a currently available meeting room MC, for example, in place of the meeting room MA. In this process, the execution determination unit 456 may retrieve a currently available external resource (e.g., meeting room) by referring to the management information stored and managed by the management apparatus 6.

Then, the execution determination unit 456 proceeds to step S1105 to request the smart speaker 2 to input the necessary parameter (i.e., execute the feedback process), and the procedure returns to step S1001.

If the reservation time is specified (YES at step S1004), and if the external resource as the reservation target is unavailable for reservation (NO at step S1005), the execution determination unit 456 executes the processes of step S1104 and the subsequent steps described above.

The process of complementing information and inquiring about the necessary parameter is thus executed by the management program in accordance with the above-described procedure. As described above, the interpretation result conversion unit 453 and the execution determination unit 456 involved in the process of complementing information and inquiring about the necessary parameter may cooperate with each other to function as the acquisition control unit 462. The above-described example of the process of complementing information and inquiring about the necessary parameter is mainly executed by the complementing unit 454. The processes and determinations in the above-described steps, however, are not necessarily mainly executed by the complementing unit 454. The AI assistant server 4 or the cloud service apparatus 5 may be configured such that the complementing unit 454 is replaced by other functional units, such as the acquisition unit 452 and the execution instruction unit 455, for example, to implement the above-described functions. Such a configuration may be changed as necessary in accordance with the processing capacities of the apparatuses and CPUs forming the input operation system 1 and the configurations of the programs executed in the input operation system 1, for example. Further, the above-described flowchart is illustrative, and the process of complementing information and inquiring about the necessary parameter may be executed in accordance with a flowchart including other condition determinations and processes.

Further, in the first embodiment, if the user wants to reserve the projector P1 as an equipment resource when reserving the meeting room MA, for example, the user may provide an utterance "Reserve the meeting room MA and the projector P1," or may provide utterances "Reserve the meeting room MA" and "Reserve the projector P1 as well." That is, there is no limitation on whether the user says a plurality of external resource names in one utterance or says each of the external resource names in one utterance.

Returning to the description of the sequence chart in FIG. 9, the interpretation result conversion unit 453 generates the information necessary for reserving the external resource (i.e., the meeting room MA) with the information complemented by the complementing unit 454 at step S108. The generated information is then transmitted to the management apparatus 6 (or the meeting room 7) via the communication control unit 451 as the command such as the reservation execution command or the predetermined process execution command (step S109). More specifically, the execution instruction unit 455 acquires the connection information for accessing the management apparatus 6 based on the device ID acquired from the smart speaker 2 and the management apparatus association table 402b. The execution instruction unit 455 then connects to the management apparatus 6 based on the acquired connection information, and transmits the execution command to the management apparatus 6. In this process, the execution instruction unit 455 may transmit, as necessary, information such as the account information and the password stored in the management apparatus association table 402b to the management apparatus 6 to access the management apparatus 6.

In this process, the interpretation result conversion unit 453 and the communication control unit 451 function as a transmission unit that transmits data to the management apparatus 6 or the meeting room 7, for example. In this case, a reservation execution command "RESERVE MEETING ROOM (USE TIME=1 HOUR)" is transmitted to the management apparatus 6 from the cloud service apparatus 5 (or the AI assistant server 4).

With the transmission of this reservation execution command, the process of reserving the meeting room MA is executed. Since the external resource such as a meeting room is just a space facility, such an external resource per se does not often receive and execute a command such as the reservation execution command. As described above, therefore, the communication control unit 451 may transmit the reservation execution command to the management apparatus 6 that manages the meeting room MA. In this case, on behalf of the meeting room MA, the reservation execution unit 654 of the management apparatus 6 executes the reservation execution command transmitted from the cloud service apparatus 5 (or the AI assistant server 4). Further, the reservation execution unit 654 may transmit, via the notification unit 655, a notification such as a reservation completion notification to the user who has executed the reservation of the meeting room MA to notify that the reservation process has been completed. That is, the management apparatus 6 updates the management information based on the reservation execution command acquired from the cloud service apparatus 5, to thereby execute the reservation of the external resource.

To convert the interpretation result into the reservation execution command for reserving the meeting room 7, the information of TABLE 1 described in detail below may be stored in a memory such as the HDD 44 of the AI assistant server 4, for example, such that the interpretation result conversion unit 453 refers to the stored information.

The table data used in the present embodiment will be described with reference to specific examples illustrated in TABLE 1 and TABLE 2 given below.

TABLE 1 illustrates examples of the interpretation result and the predetermined process execution command converted from the interpretation result.

TABLE 1

| Name | Value | Processing of voice assistant application |
|---|---|---|
| Action | RESERVATION_EXECUTE | Reserving a meeting room |
|  | DOORKEY_EXECUTE | Unlocking or locking a door |
|  | LIGHT_ON_OFF_EXECUTE | Turning on or off light |
|  | AIR-CONDITIONING_EXECUTE | Controlling air conditioning (ventilation) |
|  | ... |  |
| Parameter | Meeting room number | Managing (changing) the meeting room number |
|  | Start time | Managing (changing) the meeting start time |
|  | End time | Managing (changing) the meeting end time |
|  | Number of participants | Managing (changing) the number of participants in the meeting |
|  | * |  |

The AI assistant server 4 stores, in a memory such as the HDD 44, the table data in TABLE 1 including the predetermined process execution command to the management apparatus 6 or the external resource. The information of TABLE 1 may be stored in the HDD 64 of the management apparatus 6 such that the interpretation result conversion unit 453 of the AI assistant server 4 refers to the stored information to convert the interpretation result obtained by the information recognition server 3 into the predetermined process execution command.

In the example of TABLE 1, "RESERVATION_EXECUTE," "DOORKEY_EXECUTE," "LIGHT_ON_OFF_EXECUTE," and "AIR_CONDITIONING_EXECUTE," for instance, are given as examples of the action or intent. Further, "meeting room number," "start time," "end time," and "number of participants," for instance, are given as examples of the parameter. The field of parameter indicated by the asterisk in TABLE 1 may include any other parameter specifiable as a setting value for the predetermined process execution command.

The interpretation result conversion unit 453 converts the interpretation result of an action "RESERVATION_EXECUTE" into a command to the meeting room MA for "reserving a meeting room." The interpretation result conversion unit 453 similarly converts the interpretation result of an action "DOORKEY_EXECUTE" into a command to the meeting room MA for "unlocking or locking a door," and converts the interpretation result of an action "LIGHT_ON_OFF_EXECUTE" into a command to the meeting room MA for "turning on or off light." The interpretation result conversion unit 453 similarly converts the interpretation result of an action "AIR_CONDITIONING_EXECUTE" into a command to the meeting room MA for "controlling air conditioning (ventilation)."

Further, if the interpretation result includes the parameter "meeting room number," the interpretation result conversion unit 453 generates a command to the meeting room MA for "managing (changing) the meeting room number." If the interpretation result includes the parameter "start time," the interpretation result conversion unit 453 generates a command to the meeting room MA for "managing (changing) the meeting start time." If the interpretation result includes the parameter "end time," the interpretation result conversion unit 453 generates a command to the meeting room MA for "managing (changing) the meeting end time." If the interpretation result includes the parameter "number of participants," the interpretation result conversion unit 453 generates a command to the meeting room MA for "managing (changing) the number of participants in the meeting."

That is, the interpretation result conversion unit 453 of the AI assistant server 4 converts the interpretation result into the predetermined process execution command by determining the type of the predetermined process execution command to the meeting room MA based on the information included in the action or intent of the interpretation result and by determining the value included in the parameter as the setting value for the predetermined process execution command.

TABLE 2 given below illustrates examples of the interpretation result fed back to the smart speaker 2 from the AI assistant server 4.

The AI assistant server 4 stores, in a memory such as the HDD 44, the table data including the predetermined process execution command in TABLE 2. The information of TABLE 2 may be stored in the HDD 64 of the management apparatus 6 such that the interpretation result conversion unit 453 of the AI assistant server 4 refers to the stored information to convert the interpretation result obtained by the information recognition server 3 into the predetermined process execution command.

In the example of TABLE 2, an action such as "DATE SETTING" for prompting the user to input the date and time of using the meeting room, "DATE CONFIRM" for prompting the user to confirm the date and time of using the meeting room, "LIGHT CONTROL" for checking the desired brightness of light, or "NEXT RESERVATION CONFIRM" for checking if there is a next reservation, for example, is included in the interpretation result and fed back to the smart speaker 2.

The feedback unit 253 of the smart speaker 2 is capable of determining the contents of the feedback to the user in accordance with the action, the parameter, and the response included in the interpretation result. Therefore, the information of TABLE 2 may be stored in a memory such as the ROM 23 of the smart speaker 2 such that the feedback unit 253 refers to the stored information to determine the contents of the feedback.

Further, the parameters such as the meeting room number, the start time, the end time, and the number of participants, for example, may be included in the interpretation result and fed back to the smart speaker 2. Further, if there is any missing necessary parameter, a message for prompting the user to input the missing necessary parameter may be included in the interpretation result as a response and fed back to the smart speaker 2. Similarly as in TABLE 1, the field of parameter indicated by the asterisk in TABLE 2 may include any other parameter specifiable as a setting value for the predetermined process execution command.

The reservation execution unit 654 of the management apparatus 6 updates the management information based on the reservation execution command or the predetermined process execution command received from the AI assistant

TABLE 2

| Name | Value | Processing of voice assistant application |
|---|---|---|
| Action | DATE_SETTING | Prompting the user to input the date and time of using the meeting room |
|  | DATE_CONFIRM | Prompting the user to confirm the date and time of using the meeting room |
|  | LIGHT_CONTROL | Checking the desired brightness of light |
|  | NEXT_RESERVATION_CONFIRM | Checking if there is a next reservation |
|  | . . . |  |
| Parameter | Meeting room number | Managing (changing) the meeting room number |
|  | Start time | Managing (changing) the meeting start time |
|  | End time | Managing (changing) the meeting end time |
|  | Number of participants | Managing (changing) the number of participants in the meeting |
|  | * |  |
| Response | text | Feeding back the contents specified in the text | server 4, to thereby execute a process such as the reservation of the external resource or the predetermined process (step S110).

A description will be given below of the processes performed by related functions of the management apparatus 6 in the execution of the reservation execution command or the predetermined process execution command by the reservation execution unit 654.

The retrieval unit 653 first identifies the user based on user settings included in the predetermined process execution command. Specifically, the retrieval unit 653 identifies the user by retrieving the user from the reservation management table 601 (i.e., the management information) previously registered in the management apparatus 6.

The retrieval unit 653 further identifies the external resource as the reservation target based on external source settings included in the predetermined process execution command. Specifically, for example, the retrieval unit 653 identifies the external resource as the reservation target by retrieving the external resource from the reservation management table 601 (i.e., the management information) previously registered in the management apparatus 6. The retrieval unit 653 thereby manages the information of the user and the external resource to enable the user having specified the external resource to reserve the specified external resource. If there is no registered user matching the user settings, the retrieval unit 653 may use the user settings included in the predetermined process execution command as the information of the user. Further, if the user settings are not included in the predetermined process execution command, a default user name may be set as the name of the user.

Further, if a condition such as the reservation date and time is not specified in the predetermined process execution command, the retrieval unit 653 may set a default value for the condition. The default value may be changed from the client PC connected to the smart speaker 2 or the input operation system 1 of the present embodiment via the network 8, for example.

When the reservation process succeeds or fails, the notification unit 655 may notify the user of information representing the reservation result. As a notification method employed in this case, the notification unit 655 notifies the management program executed by the AI assistant server 4 of the success or failure of the reservation of the external resource, for example. The notification unit 655 further transmits the notification of the reservation success or failure to the smart speaker 2 via the operation voice conversion program, for example, and the smart speaker 2 notifies the user of the reservation success or failure in sound or as information displayed on a screen. Further, based on address information included in user information or address information stored in the management apparatus 6 in association with user information, for example, the notification unit 655 may transmit an electronic mail, for example, to the user having executed the reservation process.

The function of the notification unit 655 to transmit information such as the above-described reservation success or failure or the reservation status of the external resource to the smart speaker 2 may be included in the cloud service apparatus 5 (or the AI assistant server 4).

Further, the notification unit 655 may display the information such as the reservation success or failure or the reservation status of the external resource on the display 68 (e.g., a display or an operation panel) of the management apparatus 6. Thereby, the user is able to visually recognize that the external resource has been successfully reserved with the utterance provided by the user, for example. The notification unit 655 may alternatively output the notification in sound instead of displaying the information on the display 68.

In the first embodiment described above, the management program executed by the AI assistant server 4 identifies the user or the external resource based on the device ID or the user ID, for example. The identification process, however, is not limited thereto. For example, the management apparatus 6 may identify the user or the external resource. In this case, the management program transmits, to the management apparatus 6, the predetermined process execution command including the device ID or the user ID. The retrieval unit 653 of the management apparatus 6 then identifies the user or the external resource based on the device ID or the user ID included in the predetermined process execution command. As a method of identifying the user or the external resource, the method explained in the above description of step S109 is employed. Alternatively, the retrieval unit 653 may retrieve and identify the user or the external resource by using not the information stored in the management DB 401 but information stored in a separate database in the management apparatus 6 or an external database accessible to the management apparatus 6, for example.

Then, the meeting room MA (i.e., the meeting room 7) specified as the reservation target by the management apparatus 6 executes a process such as automatically unlocking the door of the meeting room 7 or turning on the lighting apparatus, for example, based on the information related to the reservation process transmitted from the reservation execution unit 654 of the management apparatus 6, for example (step S111). This process may be executed upon acquisition of a notification from the management apparatus 6. The time at which this process is executed, however, is not limited thereto.

For example, if the meeting room 7 has previously acquired a predetermined notification, the meeting room 7 may execute control to automatically operate the lighting apparatus or the air-conditioning system of the meeting room 7 at the reservation time included in the notification. Further, with the environment of the input operation system 1, for example, the reservation execution unit 654 of the management apparatus 6 may transmit, to the user having reserved the meeting room MA, an electronic mail embedded with an unlock code or a quick response (QR) code (registered trademark) for unlocking the meeting room MA, for example. In this case, in response to receipt of the electronic mail, the user may print out the unlock code or the QR code or copy the information of the unlock code or the QR code on a predetermined card, for example, and may hold the print or the card over an authentication information reader installed in the door of the meeting room MA, to thereby unlock the meeting room MA. Further, in this case, the input operation system 1 may start controlling the lighting apparatus or the air-conditioning system of the meeting room MA in coordination with the unlocking of the door. If the external resource is an apparatus such as an MFP, the input operation system 1 may power on the apparatus or start network setting in accordance with the predetermined process execution command transmitted from the management apparatus 6, to thereby start and execute a process such as printing or transmitting a predetermined file. Further, various settings may be executed such that, together with the meeting room MA reserved in the above-described sequence of processes, target apparatuses (e.g., an MFP, a projector, an IWB, and an UCS) previously installed in the meeting room MA are also reserved to be usable during the reservation time of the meeting room MA. If the meeting room MA is not equipped with an external resource desired by the user, the input operation system 1 may prompt the user of the meeting room MA to provide, through an utterance, information related to the meeting room MA and the external resource (i.e., an equipment resource such as a projector) to the smart speaker 2 to newly make a reservation for the external resource.

In response to the audio information obtained from the user utterance, the input operation system 1 of the present embodiment may automatically execute the reservation of equipment resources related to the external resource, as well as the reservation of the external resource, with machine learning using the information of a past reservation history and a past use history of the external resource and the various table data of the association DB 402 in FIGS. 5A to 5C, for example.

As understood from the above description, the input operation system 1 of the first embodiment installs, in the smart speaker 2, programs including the operation voice processing program as a platform application program, to thereby enable the smart speaker 2 to communicate with the cloud service apparatus 5 in accordance with the platform application program. When the user performs the voice input operation by speaking to the microphone 29 or the imaging device 30 of the smart speaker 2, the cloud service apparatus 5 analyzes the contents of the user utterance, and operates the external resource such as the meeting room 7 to execute the reservation instruction or the predetermined process execution instruction provided by the user.

With this configuration, the operation for reserving the external resource or executing the predetermined process is implemented with the voice of the user utterance, thereby obviating the need for an operation using a graphical user interface (GUI) such as the touch panel 27. This configuration therefore makes the input operation faster and easier even for a user experienced with operations. Further, the interactive operation support obviates the need for complicated network setting, advanced process setting, and the installation of a new application program, for example, enabling a senior user or a user inexperienced in operating apparatuses to perform a desired operation faster and with more ease, thereby improving convenience.

Further, since the intention of the user is analyzed based on the text data obtained from the contents of the user utterance, the process based on the user utterance is determined and executed by the cloud service apparatus 5 (or the AI assistant server 4).

A second embodiment of the present invention will be described. The following description of the second embodiment will focus on differences from the first embodiment. Therefore, features of the second embodiment not particularly mentioned below may be similar to those of the first embodiment, and thus detailed description thereof will be omitted.

In the second embodiment, the audio information provided by the user corresponds to an instruction to check the reservation status of the external resource. That is, the second embodiment is different in function from the first embodiment in the following point. In the first embodiment, the audio information provided by the user includes the instruction to execute the reservation of the external resource (e.g., a meeting room). In the second embodiment, on the other hand, the audio information provided by the user includes the instruction to check the presence or absence of an external resource (e.g., a meeting room) currently available for reservation (i.e., currently available) and check the status of the currently available external resource, but does not include the specific instruction to execute the reservation of the external resource. That is, the second embodiment is different from the first embodiment in the instruction information provided by the user and the contents of the intent and the parameters generated from the instruction information. These differences further change the complementing process executed by the execution determination unit 456 of the AI assistant server 4.

Specifically, in the first embodiment, if the user issues an instruction to reserve the meeting room MA, and if the user utterance does not contain information related to the reservation time and the name of the external resource as the reservation target, for example, the complementing unit 454 of the cloud service apparatus 5 (or the AI assistant server 4) identifies the external resource and complements the time information. If the complementing process by the complementing unit 454 is insufficient to identify the external resource and the time information, the interpretation result conversion unit 453 executes the feedback process to request the user to input the information of the external resource and the time information. That is, the process of complementing information such as the information of the external resource and the time information related to the reservation of the external resource is an example of the complementing process executed by the complementing unit 454 of the AI assistant server 4.

In the second embodiment, on the other hand, if the user issues an instruction to check an available external resource (e.g., meeting room), for example, the cloud service apparatus 5 (or the AI assistant server 4) searches for an available meeting room with reference to the user management table 402a, the management apparatus association table 402b, and the resource management table 402c. Then, if there is a meeting room available for reservation, the cloud service apparatus 5 (or the AI assistant server 4) generates a reservation status check command to be transmitted to the meeting room to check the reservation status of the meeting room. That is, the above-described search process and the process of complementing the information for checking the reservation status form an example of the complementing process executed by the complementing unit 454 of the AI assistant server 4. In the second embodiment, if there is no meeting room available for reservation and any other suitable meeting room is not found by a predetermined number of searches for other meeting rooms, the interpretation result conversion unit 453 of the cloud service apparatus 5 (or the AI assistant server 4) executes the feedback process by transmitting a predetermined message to the user.

In the second embodiment, the process of retrieving the external resource based on the device ID of the smart speaker 2 or the user ID, the process of determining, based on the acquired intent and parameters, whether the necessary parameters used to check the reservation status of the external resource (e.g., the meeting room) are complete and complementing any missing necessary parameter, and the feedback process to the user accompanying the complementing process are similar to those of the first embodiment described above, and thus description thereof will be omitted. In the following, other processes executed in the second embodiment will be described in detail. Specific processes related to the above-described differences will be described with reference to a sequence chart and a flowchart.

FIG. 11 is a sequence chart illustrating a procedure of processes executed in the second embodiment. With reference to the sequence chart of FIG. 11, a description will be given of an example in which the states of various external resources are checked from the information input device, Specifically, in the following example of the second embodiment, the reservation status of the external resource such as a meeting room is checked in response to the user utterance input via the smart speaker 2. The second embodiment may be implemented by the input operation system 1, the hardware configurations, and the functional configurations of the first embodiment described above, and thus detailed description thereof will be omitted unless otherwise particularly mentioned.

The acquisition unit 252 of the smart speaker 2 first acquires the voice of the user utterance "Let me know any available meeting room" as the audio information (step S201). To acquire the voice as the audio information, the acquisition unit 252 may use the microphone 29 illustrated in FIG. 2, for example. In the second embodiment, the utterance is not limited to the above example, and may be any utterance communicating an inquiry about the status of the external resource such as the reservation status or the use status thereof, for instance. For example, the utterance may include an instruction to check the reservation status or the use status of the equipment resource in place of or in addition to the reservation status or the use status of the facility resource. That is, the utterance may include an instruction to check the respective reservation statuses of a plurality of external resources at the same time. Further, the above example of the utterance specifies an external resource type "meeting room," but the utterance is not limited thereto. For example, an utterance "Let me know if the meeting room MA is available" may be used to issue an instruction to check the reservation status of a specific external resource, i.e., the meeting room MA.

Steps S202 to S205 in FIG. 11 are similar to steps S102 to S105 of the first embodiment in FIG. 9, and thus description thereof will be omitted.

Then, programs such as the operation voice conversion program are executed in the information recognition server 3. Thereby, the interpretation unit 354 interprets data such as the text data converted from the audio data, and generates the intent and the parameters (step S206). For example, "CONFIRM_RESERVATION" and "EXTERNAL RESOURCE TYPE=MEETING ROOM," are generated as the intent and a parameter, respectively. Herein, the intent information represents the type of the predetermined process. In the second embodiment, the intent is information for checking with the management apparatus 6 about the reservation status of the external resource, and the parameter is information for identifying the type of the external resource. For example, the parameter may be information for identifying the type of the external resource such as "meeting room" or "projector," or may be information for identifying the external resource per se such as "the meeting room MA" or "the projector P1." Further, the parameter may be information related to an inquiry about the reservation of the external resource such as the reservation date and time of the external resource or the user of the external resource. If the user issues an instruction to check the respective reservation statuses of a plurality of external resources, a plurality of information items for identifying the plurality of external resources may be generated.

Then, the interpretation unit 354 transmits the generated intent and parameters and the device ID of the smart speaker 2 to the management program executed by the AI assistant server 4 (step S207).

An information complementing and inquiring process of the second embodiment will be described.

In response to receipt of the above-described inquiry from the user about an available meeting room, the retrieval unit 460 of the cloud service apparatus 5 (or the AI assistant server 4) searches for an available meeting room (i.e., external resource) by referring to the management apparatus association table 402b and the resource management table 402c. Then, if there is a meeting room available for reservation, the reservation status check command is generated to be transmitted to the meeting room to check the reservation status of the meeting room. The above-described process of searching for an available meeting room and generating the reservation status check command is an example of the complementing process executed by the complementing unit 454. If no suitable meeting room is found by a predetermined number of searches for other meeting rooms, the interpretation result conversion unit 453 of the cloud service apparatus 5 (or the AI assistant server 4) executes the feedback process by transmitting a predetermined message to the user (step S208).

The information complementing and inquiring process of the second embodiment will be described in more detail.

Relating to step S208 described above, a description will be given of an example of the information complementing and inquiring process by the management program executed in the cloud service apparatus 5 (more specifically, the AI assistant server 4).

FIGS. 12A and 12B are a flowchart illustrating the information complementing and inquiring process of the second embodiment.

Steps S1001 and S1002 in FIG. 12A are similar to steps S1001 and S1002 of the first embodiment in FIG. 10A, and thus description thereof will be omitted.

If the user is identifiable based on the acquired data (YES at step S1002), the interpretation result conversion unit 453 determines, based on the acquired data, whether the reservation status check target is specified (step S2001). As an example of the method of determining whether the reservation status check target is specified, information such as the external resource name or the external resource ID of the external resource may be identified. The user utterance used in this determination may be "Let me know if the meeting room MA is available" or "Let me know any available meeting room," for example.

If the external resource as the reservation status check target is specified in the user utterance, as in the utterance "Let me know if the meeting room MA is available" in which "the meeting room MA" is specified as the external resource, for example (YES at step S2001), the interpretation result conversion unit 453 determines whether the meeting room MA is available for reservation (step S2002).

If the meeting room MA is available for reservation (YES at step S2002), the interpretation result conversion unit 453 sets the meeting room MA as the reservation status check target based on the contents of the user utterance, and determines the reservation date and time of the meeting room MA, for example (step S2003). In this case, the interpretation result conversion unit 453 determines whether the meeting room MA is available for reservation by checking the current and future reservation status of the target external resource with the clock information managed by the management program and the management information managed by the management apparatus 6, for example. More specifically, based on the device ID acquired from the smart speaker 2 and the management apparatus association table 402b, the interpretation result conversion unit 453 acquires the connection information for accessing the management apparatus 6. Then, the interpretation result conversion unit 453 accesses the management apparatus 6 based on the acquired connection information, and refers to the reservation management table 601 (i.e., the management information). The interpretation result conversion unit 453 may request the management apparatus 6 to transmit thereto the management information. Thereby, the execution determination unit 456 checks the reservation status of the reservation status check target. Herein, the execution determination unit 456 checks the reservation status of the meeting room MA in the management information, and if there is a date and time when the meeting room MA is available, the execution determination unit 456 determines that the meeting room MA is available, i.e., that it is possible to reserve the meeting room MA. If there is no date and time when the meeting room MA is available, on the other hand, the execution determination unit 456 determines that the meeting room MA is unavailable, i.e., that it is not possible to reserve the meeting room MA. The above-described processes of the interpretation result conversion unit 453 and the execution determination unit 456 are similar to those of the first embodiment.

The interpretation result conversion unit 453 converts the acquired data into the reservation status check command to the meeting room MA as the reservation status check target (step S2004), and the procedure is completed.

If no specific meeting room (i.e., external resource) is specified as the reservation status check target in the user utterance, as in the utterance "Let me know any available meeting room," for example (NO at step S2001), the interpretation result conversion unit 453 determines whether the value of a search count flag Ns is less than three (step S2005). The initial value of the search count flag Ns is set to zero, for example.

If the value of the search count flag Ns is less than three (YES at step S2005), the interpretation result conversion unit 453 retrieves meeting rooms (i.e., external resources) by referring to the user management table 402a, the management apparatus association table 402b, and the resource management table 402c (step S2006). Herein, the information complementing process is executed.

The interpretation result conversion unit 453 then determines whether the meeting rooms retrieved at step S2006 include any meeting room available (i.e., available for reservation) for a predetermined time from the current time (step S2007).

If the meeting rooms retrieved at step S2006 include at least one meeting room available for the predetermined time from the current time (YES at step S2007), the interpretation result conversion unit 453 proceeds to step S2003 to execute the above-described processes.

If the meeting rooms retrieved at step S2006 does not include any meeting room available for the predetermined time from the current time (NO at step S2007), the interpretation result conversion unit 453 increments the search count flag Ns by 1 (step S2008), and returns to the determination process of step S2005.

If the value of the search count flag Ns reaches or exceeds three after repeated execution of the process of step S2008 (NO at step S2005), the interpretation result conversion unit 453 determines that there is no available meeting room. The interpretation result conversion unit 453 then controls the communication control unit 451 to output a predetermined message to the feedback unit 253 of the smart speaker 2 used by the user (step S2009). In the above-described determination of the value of the search count flag Ns, the maximum value of the search count flag Ns is set to three. The maximum value of the search count flag Ns, however, is not limited thereto. In the second embodiment, the maximum value of the search count flag Ns may be set to a desired value based on various factors such as the number of external resources managed by the input operation system 1 and the frequency of reservations.

In the second embodiment, the process of implementing information and inquiring about the necessary parameter is thus executed in accordance with the above-described procedure. As described above, the interpretation result conversion unit 453 and the execution determination unit 456 involved in the process of complementing information and inquiring about the necessary parameter may cooperate with each other to function as the acquisition control unit 462.

The above-described example of the process of implementing information and inquiring about necessary parameter is mainly executed by the interpretation result conversion unit 453 and the execution determination unit 456. The processes and determinations in the above-described steps, however, are not necessarily mainly executed by the interpretation result conversion unit 453 and the execution determination unit 456.

Further, the AI assistant server 4 or the cloud service apparatus 5 may be configured such that the interpretation result conversion unit 453 and the execution determination unit 456 are replaced by other functional units, such as the acquisition unit 452 and the execution instruction unit 455, for example, to implement the above-described functions. Further, the above-described flowchart is illustrative, and the process of implementing information and inquiring about the necessary parameter may be executed in accordance with a flowchart involving other condition determinations and processes.

Further, in the second embodiment, if the user wants to check the reservation status of the projector P1 as the equipment resource when checking the reservation status of the meeting room MA, for example, the user may provide an utterance "Check if the meeting room MA and the projector P1 are available for use" or "Let me know any meeting room and projector available for use." That is, there is no particular restriction on whether the user says a plurality of external resource names at the same time in one utterance or says each of the external resource names in one utterance.

Referring back to the sequence chart of FIG. 11, the transmission of the reservation status check command to the external resource is similar to the command transmission in step S109 of the first embodiment in FIG. 9, and thus detailed description thereof will be omitted. Similarly as in the first embodiment, the interpretation result conversion unit 453 converts the intent and the parameters into the predetermined process execution command, and transmits the predetermined process execution command to the management apparatus 6 (step S209).

Following step S209, the retrieval unit 653 of the management apparatus 6 retrieves the reservation status of the external resource based on the predetermined process execution command acquired from the cloud service apparatus 5 (or the AI assistant server 4).

After retrieving the reservation status of the external resource, the retrieval unit 653 of the management apparatus 6 identifies the external resource as the reservation status check target by searching through the external resources managed by the management apparatus 6 based on the information for identifying the external resource included as a necessary parameter. The retrieval unit 653 further retrieves the reservation status of the identified external resource (step S210).

Herein, if the information for identifying the external resource included as a necessary parameter is the information specifying a single external resource such as an external resource name, the retrieval unit 653 simply retrieves the reservation status of the single external resource. If the information for identifying the external resource included as a necessary parameter is the information specifying the external resource type, on the other hand, the retrieval unit 653 retrieves the respective reservation statuses of all external resources corresponding to the specified external resource type.

If the predetermined process execution command includes a plurality of conditions such as the user and the reservation date and time, the retrieval unit 653 retrieves the reservation status of the external resource by combining the conditions. If the predetermined process execution command includes the external resource name and the reservation date and time, for example, the retrieval unit 653 retrieves the reservation status of the specified external resource on the specified date and time by referring to the reservation management table 601.

Further, if a condition such as the reservation date and time is not specified in the predetermined process execution command, the retrieval unit 653 may execute the retrieval with a default condition. For example, if the reservation date and time is not specified in the predetermined process execution command, the retrieval unit 653 may retrieve the reservation status by setting a search time range to 24 hours from the current date and time managed by a timer of the management apparatus 6, for example.

Then, the notification unit 655 of the management apparatus 6 transmits the information representing the retrieval result to the cloud service apparatus 5 (or the AI assistant server 4) via the communication control unit 651. Herein, the notification unit 655 may transmit information including the external resource name of the available external resource and the available date and time of the external resource to the cloud service apparatus 5 (or the AI assistant server 4) as the information representing the search result (step S211). The information representing the search result, however, is not limited thereto, and may include the search condition (e.g., the search time range), the location of the external resource (e.g., the name of the building, the floor, and the name of the room corresponding to the external resource), and the capacity of the external resource, for example. If the external resource is a facility resource, the capacity of the external resource may include the maximum number of people to be held in the facility resource and the types and numbers of equipment resources installed in the facility resource (e.g., the presence or absence of a projector). If the external resource is an equipment resource, the capacity of the external resource may include the functions of a facility resource or a device or apparatus with which the equipment resource is used.

If the external resource name is specified in the command such as the predetermined process execution command, and if the specified external resource is found unavailable, the retrieval unit 653 may retrieve the reservation status of an external resource that is the same in type as the specified external resource (e.g., the meeting room MB) by referring to the reservation management table 601, and may transmit the retrieval result to the cloud service apparatus 5 (or the AI assistant server 4). For example, in response to a user instruction to check the availability status of the meeting room MA, the meeting room MA may be found unavailable for reservation, but the meeting room MB may be available which is substantially the same in size as the meeting room MA and includes equipment resources available for use. In this case, the notification unit 655 may notify the cloud service apparatus 5 of the reservation status of the meeting room MB. The meeting room MB in this case may be one of the external resources managed by, for example, the department or section of the company to which the user (i.e., the user who has issued the instruction to check the availability status of the meeting room MA) belongs. That is, an alternative candidate for the external resource may be extracted from the information of the department or section associated with the user, for example.

Further, in response to the user instruction to check the availability status of the meeting room MA, the meeting room MA may be found unavailable for reservation (e.g., already reserved by another user) in a certain time slot. In this case, the notification unit 655 may transmit a message to the cloud service apparatus 5 (or the AI assistant server 4) to ask whether the user wishes to share the meeting room MA with the another user. Such a response of the management apparatus 6 may also be applied to a car sharing service, for example, in which a plurality of users use the same resource (e.g., vehicle) in the same time slot.

Then, the notification unit 458 of the AI assistant server 4 transmits the information of the retrieval result acquired from the management apparatus 6 to the smart speaker 2 via programs such as the operation voice conversion program (step S212).

The feedback unit 253 of the smart speaker 2 outputs the sound or image, for example, representing the information of the retrieval result acquired from a program such as the operation voice conversion program, to thereby notify the user of the information (step S213).

Further, the notification unit 655 of the management apparatus 6 may display the above-described check result of the reservation status on the display 68 (e.g., a display or an operation panel) of the management apparatus 6. Thereby, the user is able to visually recognize the reservation status of an external resource provided in response to the utterance given by the user. The notification unit 655 may alternatively output the check result in sound instead of displaying the check result on the display 68 to notify the user of the check result.

In the second embodiment described above, the management apparatus 6 transmits the information of the reservation status of an apparatus or any other external resource to the smart speaker 2 via the cloud service apparatus 5 (or the AI assistant server 4). The transmission of the information, however, is not limited thereto. For example, the management apparatus 6 may directly transmit the information of the reservation status of the apparatus or external resource to the smart speaker 2. In this case, the predetermined process execution command may include a request to notify the smart speaker 2 of the reservation status and the information for use in accessing the smart speaker 2 such as the address information of the smart speaker 2. Further, the notification destination of the reservation status is not limited to the smart speaker 2. For example, the reservation status may be notified to the client PC or another information input device directly or via the cloud service apparatus 5 (or the AI assistant server 4).

As understood from the above description, the input operation system 1 of the second embodiment installs, in the smart speaker 2, programs including the operation voice processing program as a platform application program, to thereby enable the smart speaker 2 to communicate with the cloud service apparatus 5 in accordance with the platform application program. When the user performs the voice input operation by speaking to the microphone 29 or the imaging device 30 of the smart speaker 2, the cloud service apparatus 5 analyzes the contents of the user utterance, and transmits a user instruction such as the instruction to check the reservation status of the external resource to the management apparatus 6. Then, the management apparatus 6 retrieves information such as the reservation status of the external resource (e.g., the meeting room 7) managed by the management apparatus 6, and notifies the user of the information.

With this configuration, the operation for checking the reservation status of the external resource, for example, is implemented with minimum necessary operations including the operation using the voice of the user utterance, thereby obviating the need for the operation using a GUI such as the touch panel 27. This configuration therefore makes the input operation faster and easier even for a user experienced with operations. Further, the interactive operation support obviates the need for complicated network setting, advanced process setting, and the installation of a new application program, for example, enabling a senior user or a user inexperienced in operating apparatuses to perform a desired operation faster and with more ease, thereby improving convenience.

Further, since the intention of the user is analyzed based on the text data obtained from the contents of the user utterance, the process based on the user utterance is determined and executed by the cloud service apparatus 5 (or the AI assistant server 4).

The information input device of the foregoing embodiments is not limited to the smart speaker, and may be any device equipped with functions such as a microphone function, an imaging function, a speaker function, a display function, an operation function, and a communication function. The information input device may be a laptop PC, a mobile phone, a smartphone, a tablet terminal, a gaming system, a personal digital assistant (PDA), a digital camera, a wearable PC, or a desktop PC, for example.

Further, the information processing apparatus of the foregoing embodiments is communicable with the information input device, the target apparatus, and the external resource managed by the target apparatus, for example. Further, the information processing apparatus is not necessarily implemented by the information recognition server and the AI assistant server, and may be any apparatus equipped with functions such as a server function.

Similarly, the external resource of the foregoing embodiments may be any type of resource other than the above-described meeting room, such as an apparatus resource or a facility resource communicable via a network and sharable by a plurality of users. Further, the external resource may be a vehicle resource used in a car sharing service allowing a plurality of people to use a rental car in different times and places, the Uber (registered trademark) service, or a ride-sharing taxi service, for example. If the external resource is the above-described vehicle resource, the notification transmitted to the external resource from the management apparatus 6 may include information related to the unlocking of the vehicle, the activation of the engine, or the activation of an air-conditioning system of the vehicle, for example.

Further, as described above, the external resource may be at least one electronic apparatus such as an MFP, a projector, an IWB, or a UCS. In this case, for example, the MFP may be controlled by the management apparatus 6, but may directly receive the execution command from the cloud service apparatus 5 without via the management apparatus 6 and execute the process according to the execution command, for example. That is, the MFP may have the function of the target apparatus described above in the foregoing embodiments.

FIG. 13 is a diagram illustrating general arrangement of an input operation system 11 of a modified example of the first embodiment. Apparatuses forming the input operation system 11 are similar to those of the input operation system 1 of the first embodiment illustrated in FIG. 1. That is, the input operation system 11 includes an information input device 12, an information recognition server 13, an AI assistant server 14, a management apparatus 16, and an external resource 17, which are connected to each other via a network 18. The information recognition server 13 and the AI assistant server 14 form a cloud service apparatus 15. The input operation system 11 may form an input response system 19 with the information input device 12, the management apparatus 16, and the external resource 17. The AI assistant server 14 stores a management DB 1401 and an association DB 1402.

As described above, the information input device 12 of the modified example is not limited to the smart speaker, and may be any device with functions such as a microphone function, an imaging function, a speaker function, a display function, an operation function, and a communication function. For example, the information input device 12 may be a laptop PC, a mobile phone, a smart hone, or a tablet terminal, for example. Further, as described above, the external resource 17 is not limited to the meeting room, and may be a vehicle resource (e.g., a rental car or a taxi), an MFP, a projector, an IWB, or a UCS, for example. Similarly as in the first embodiment, one or both of the management apparatus 16 and the external resource 17 may function as the target apparatus.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

For example, in the above-described first embodiment, the information recognition server 3 generates the text data corresponding to the user utterance, and the AI assistant server 4 interprets the operation intended by the user based on the generated text data. Alternatively, the voice recognition function and the interpretation function of the information recognition server 3 and the AI assistant server 4 may be included in the smart speaker 2 such that the smart speaker 2 interprets the intended operation based on the user utterance. This configuration obviates the need for the information recognition server 3 and the AI assistant server 4, thereby simplifying the system configuration of the input operation system 1.

Each of the functions of the described embodiments may be implemented by one or more processing circuits or circuitry. Circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. An information processing system comprising:
    an information input device configured to acquire audio information; and
    an information processing apparatus connected to the information input device via a network, the information processing apparatus including circuitry configured to
    based on a determination that the audio information acquired by the information input device is incomplete, determine whether information previously registered in the information processing apparatus refers to an available resource and, in response to a determination that the information previously registered in the information processing apparatus refers to the available resource, complement the audio information based on the information previously registered in the information processing apparatus,
    convert the audio information into process information, and
    transmit the process information to a target apparatus.

2. The information processing system of claim 1, wherein when converting the audio information into the process information, the circuitry requests the information input device to acquire information.

3. The information processing system of claim 2, wherein the process information includes a reservation execution command for executing a reservation of a target managed by the target apparatus, and
    wherein when converting the audio information into the reservation execution command of the process information, based on a determination that the audio information lacks date and time information for executing the reservation, the circuitry complements the audio information with a reservation time,
    the reservation time being a certain time period for which the target managed by the target apparatus is to be reserved, and which starts from a certain date and time represented by date and time information managed by the information processing apparatus.

4. The information processing system of claim 3, wherein the circuitry calculates the certain time period from a difference between a first reservation start time included in the reservation execution command and a second reservation start time included in another reservation execution command for executing a reservation of the target managed by the target apparatus.

5. The information processing system of claim 2, wherein the process information includes a reservation status check command for checking a reservation status of a target managed by the target apparatus, and
    wherein when converting the audio information into the reservation status check command of the process information, based on a determination that the target managed by the target apparatus and specified in the audio information is unavailable for reservation, the circuitry replaces the target managed by the target apparatus and unavailable for reservation with another target managed by the target apparatus and available for reservation to complement the audio information.

6. The information processing system of claim 5, wherein the circuitry notifies the information input device of a reservation status of the another target managed by the target apparatus and replacing the target managed by the target apparatus and unavailable for reservation.

7. The information processing system of claim 1, wherein when converting the audio information into the process information, the circuitry complements the audio information with
    resource identification information for identifying a target managed by the target apparatus,
    device identification information for identifying the information input device, and
    user identification information for identifying a user of the information input device.

8. The information processing system of claim 1, wherein the information input device is a smart speaker including at least one of a microphone, a camera, or a speaker.

9. An information processing method performed using circuitry of an information processing apparatus, comprising:
    acquiring audio information from an information input device;
    based on a determination that the acquired audio information is incomplete, determining whether information previously registered in the information processing apparatus refers to an available resource and, in response to a determination that the information previously registered in the information processing apparatus refers to the available resource, complementing the audio information;
    converting the audio information into process information based on the information previously registered in the information processing apparatus; and
    transmitting the process information to a target apparatus.

10. An information processing apparatus comprising circuitry configured to acquire audio information,
    based on a determination that the acquired audio information is incomplete, determine whether information previously registered in the information processing apparatus refers to an available resource and, in response to a determination that the information previously registered in the information processing apparatus refers to the available resource, complement the audio information based on the information previously registered in the information processing apparatus,
    convert the audio information into process information, and
    transmit the process information to a target apparatus.

* * * * *